US009791055B2

United States Patent
Stucchi et al.

(10) Patent No.: US 9,791,055 B2
(45) Date of Patent: *Oct. 17, 2017

(54) THREE-WAY THREE-POSITION CONTROL VALVE HAVING A PIEZOELECTRIC OR MAGNETOSTRICTIVE ACTUATOR, AND FUEL-INJECTION SYSTEM COMPRISING THE AFORESAID VALVE

(71) Applicant: C.R.F. Societa Consortile per Azioni, Orbassano (Turin) (IT)

(72) Inventors: Sergio Stucchi, Valenzano (IT); Raffaele Ricco, Casamassima (IT); Onofrio De Michele, Castellana Grotte (IT); Marcello Gargano, Torre a Mare (IT); Domenico Lepore, Casamassima (IT); Chiara Altamura, Taranto (IT)

(73) Assignee: C.R.F. Societa Consortile per Azioni (IT)

(*) Notice: Subject to any disclaimer, the term of this patent is extended or adjusted under 35 U.S.C. 154(b) by 723 days.

This patent is subject to a terminal disclaimer.

(21) Appl. No.: 14/285,220

(22) Filed: May 22, 2014

(65) Prior Publication Data

US 2014/0346258 A1    Nov. 27, 2014

(30) Foreign Application Priority Data

May 22, 2013  (EP) .................................... 13168666

(51) Int. Cl.
*F02M 51/00* (2006.01)
*F16K 11/044* (2006.01)
(Continued)

(52) U.S. Cl.
CPC ......... *F16K 11/044* (2013.01); *F02M 47/043* (2013.01); *F02M 47/046* (2013.01);
(Continued)

(58) Field of Classification Search
CPC .. F16K 31/0624; F16K 31/007; F16K 11/044; F16K 11/10
(Continued)

(56) References Cited

U.S. PATENT DOCUMENTS

| 4,723,575 A | 2/1988 | Kazita et al. |
| 5,918,630 A | 7/1999 | Lucas et al. |

(Continued)

FOREIGN PATENT DOCUMENTS

| EP | 2597343 A1 | 5/2013 |
| EP | 2693007 A1 | 2/2014 |

OTHER PUBLICATIONS

European Search Report from corresponding European Patent Application No. 13168666.9, dated Oct. 21, 2013, and dated Oct. 28, 2013.

*Primary Examiner* — Marguerite McMahon
*Assistant Examiner* — James Kim
(74) *Attorney, Agent, or Firm* — Heslin Rothenberg Farley & Mesiti, P.C.; Victor Cardona, Esq.

(57) ABSTRACT

An electrically actuated control valve has three mouths and three operating positions, in which the three mouths includes a first mouth for inlet of a working fluid, and a second mouth and a third mouth for outlet of the working fluid. The three operating positions include a first operating position in which a passage of fluid from the first mouth to the second mouth and the third mouth is enabled, a second operating position in which a passage of fluid from the first mouth to only one of said second and third mouths is enabled, and a third operating position in which the passage of fluid from the first to the second mouth and the third mouth is disabled. The control valve includes an electric or electromagnetic actuator for controlling the passage of fluid from the first (Continued)

mouth to the second and third mouths providing the aforesaid three operating positions.

20 Claims, 19 Drawing Sheets

(51) Int. Cl.
    *F16K 11/10*     (2006.01)
    *F16K 31/00*     (2006.01)
    *F16K 31/06*     (2006.01)
    *F02M 61/04*     (2006.01)
    *F02M 63/00*     (2006.01)
    *F02M 47/04*     (2006.01)

(52) U.S. Cl.
    CPC ........ *F02M 61/04* (2013.01); *F02M 63/0007* (2013.01); *F02M 63/0026* (2013.01); *F02M 63/0045* (2013.01); *F02M 63/0049* (2013.01); *F16K 11/10* (2013.01); *F16K 31/007* (2013.01); *F16K 31/008* (2013.01); *F16K 31/061* (2013.01); *F16K 31/0624* (2013.01); *F02M 2200/21* (2013.01); *Y10T 137/86919* (2015.04)

(58) Field of Classification Search
    USPC .......................................... 123/299; 239/583
    See application file for complete search history.

(56) References Cited

U.S. PATENT DOCUMENTS

| | | | | |
|---|---|---|---|---|
| 6,196,472 | B1* | 3/2001 | Cooke | F02M 51/0603 239/102.2 |
| 6,298,829 | B1* | 10/2001 | Welch | F02D 41/20 123/467 |
| 7,651,039 | B2* | 1/2010 | Suzuki | F02M 47/027 239/533.2 |
| 8,100,344 | B2* | 1/2012 | Kondo | F02M 47/027 123/480 |
| 8,851,118 | B2* | 10/2014 | Stucchi | B60T 8/364 137/625.64 |
| 2002/0117560 | A1* | 8/2002 | Igashira | F02M 47/027 239/585.1 |
| 2004/0244741 | A1* | 12/2004 | Diehl | F01L 9/02 123/90.12 |
| 2009/0321542 | A1* | 12/2009 | Ricco | F02M 47/027 239/585.1 |

\* cited by examiner

THREE-WAY THREE-POSITION CONTROL VALVE HAVING A PIEZOELECTRIC OR MAGNETOSTRICTIVE ACTUATOR, AND FUEL-INJECTION SYSTEM COMPRISING THE AFORESAID VALVE

CROSS REFERENCE TO RELATED APPLICATIONS

This application claims priority from European patent application No. 13168666.9 filed on May 22, 2013, the entire disclosure of which is incorporated herein by reference.

FIELD OF THE INVENTION

The present disclosure relates to an electrically or electromagnetically actuated control valve, in particular of the type comprising three mouths and three operating positions, wherein the three mouths comprise:

a first mouth for inlet of a fluid, for example fuel for an internal-combustion engine, and a second mouth and a third mouth for outlet of the working fluid, and wherein the three operating positions comprise:

a first operating position in which a passage of fluid from the first mouth to the second and third mouths is enabled, a second operating position in which a passage of fluid from the first mouth to just one of the second and third mouths is enabled, and the passage of fluid between the second and third mouths is simultaneously disabled, and a third operating position in which the passage of fluid from the first mouth to the second and third mouths is disabled, wherein the solenoid valve further comprises an electromagnet that can be controlled for causing a switching of the operating position.

GENERAL TECHNICAL PROBLEM

Numerous examples of valves with three mouths and three operating positions are known whereby a fluid communication between an inlet mouth and two outlet mouths is selectively set up in order to direct alternatively the fluid towards one of the aforesaid outlet mouths or to both of them.

In the present disclosure, the term "operating position" is intended to indicate a condition of operation of the solenoid valve in which assigned to one or more moving elements of the solenoid valve itself is a position that results, amongst other things, in a particular mode of connection of the operating mouths of the valve.

In general, the environments giving out into which are the inlet and outlet mouths have pressure values different from one another, where the maximum value of pressure impinges on the inlet mouth, whereas impinging on the outlet mouths are two different levels of pressure, which are both lower than the pressure that impinges on the inlet mouth. Switching of the solenoid valve can be exploited to modulate the level of pressure in a load connected to the inlet mouth.

However, the fact that the valve comes to work facing environments at different pressures and sometimes with marked pressure swings between them and markedly variable even in each environment, renders the dynamic behaviour of the valve difficult to control in so far as the moving elements present inside it are perturbed significantly by the pressure of the environments giving out into which are the operating mouths, and consequently their actuation will prove to be markedly conditioned by the levels of operating pressure.

In greater detail, the different levels of pressure of the environments connected to the mouths of the solenoid valve determine the modulus of the resultant of the pressure forces acting on the moving elements of the valve itself, in particular in the axial direction.

The electrical or electromagnetic actuator of the valve must consequently be sized in such a way as to be able to actuate the moving elements even when the resultant of the pressure forces assumes a maximum value. This represents the main design constraint since, as the maximum force required by the electromagnet for actuation of the moving elements increases, both the costs and the overall dimensions of the actuator increase. Nevertheless, this is accompanied with an increase of the switching times between the different operating positions of the solenoid valve, which can become at this point so long as to jeopardize the possibility of use of the valve in contexts where a high speed of response is required.

In fact, in various oleodynamic applications, it is necessary for an electrically or electromagnetically actuated control valve to guarantee not only processing of a certain flow of fluid, but also a response to the commands in extremely short times: today increasingly numerous are the applications in which response times in the region of milliseconds are required as against operating pressures in the region of several hundreds of bar.

In the European patent application No. EP 11 190 645.9 of Nov. 24, 2011, still secret at the date of the present invention, the present applicant proposed a solenoid control valve having all the characteristics listed at the start of the present description and further characterized in that it comprises a first open/close element and a second open/close element, co-operating with a first contrast seat and a second contrast seat, respectively, wherein the first open/close element and the first contrast seat are provided for regulation of the passage of fluid from the first mouth to the third mouth, wherein the second open/close element and the second contrast seat are provided for controlling the passage of fluid from the first mouth to the second mouth, the solenoid valve being moreover characterized in that the electromagnet can be actuated for impressing on the second open/close element:

a first movement whereby the second open/close element is brought into contact with the second contrast seat disabling the passage of fluid from the first mouth to the second mouth and providing a passage from the first operating position to the second operating position, and a second movement, subsequent to the first movement, whereby the second open/close element moves the first open/close element into contact against the first contrast seat, disabling the passage of fluid from the first mouth to the third mouth, hence enabling a passage from the second operating position to the third operating position, where, during the second movement, the second open/close element is in contact with the second contrast surface, and wherein moreover the first and second open/close elements are coaxial to one another and hydraulically balanced.

The solenoid valve of said prior proposal is consequently able to operate facing three environments at pressures that differ from one another and with marked pressure swings between them, where actuation of moving elements of the valve will be substantially irrespective of the levels of pressure in the environments connected to the mouths of the valve itself. Moreover, the valve is able to process high flows of fluid and will be characterized by extremely contained switching times.

OBJECT OF THE INVENTION

The object of the present invention is to improve further the valve proposed in the prior European patent application No. EP 11 190 645.9, by providing a three-way and three-position electrically or electromagnetically actuated control valve that will be suited for being advantageously used in a wide range of applications and in which in particular it is also possible to vary the law of motion of the mobile elements of the valve as desired.

SUMMARY OF THE INVENTION

The object of the present invention is achieved by a valve having the characteristics forming the subject of the ensuing claims, which form an integral part of the technical teaching provided herein in relation to the invention.

BRIEF DESCRIPTION OF THE FIGURES

The invention will now be described with reference to the annexed figures, which are provided purely by way of non-limiting example and in which.

DETAILED DESCRIPTION OF THE INVENTION

As indicated above, the embodiments of FIGS. 1-7 have already been illustrated in the European patent application No. EP 11 190 645.9 (still secret at the date of the present invention). The variants of FIGS. 8, 9 and 10 have already been illustrated in the European patent application No. EP 12 178 720.4 (still secret at the date of the present invention). The variant of FIG. 11 has been illustrated in the European patent application No. EP 13 165 631.6 (still secret at the date of the present invention).

The description of the aforesaid embodiments is useful for an understanding of the present invention, in so far as the valve according to the invention can be obtained with an identical structure, except for the fact that the electromagnetic actuator of the valves proposed previously is replaced by an actuator of the piezoelectric type or of magnetostrictive type, as will be illustrated in detail in what follows.

With reference to FIGS. 1A-1D, the reference number 1 designates as a whole a solenoid valve according to a preferred embodiment.

Figure 1A:
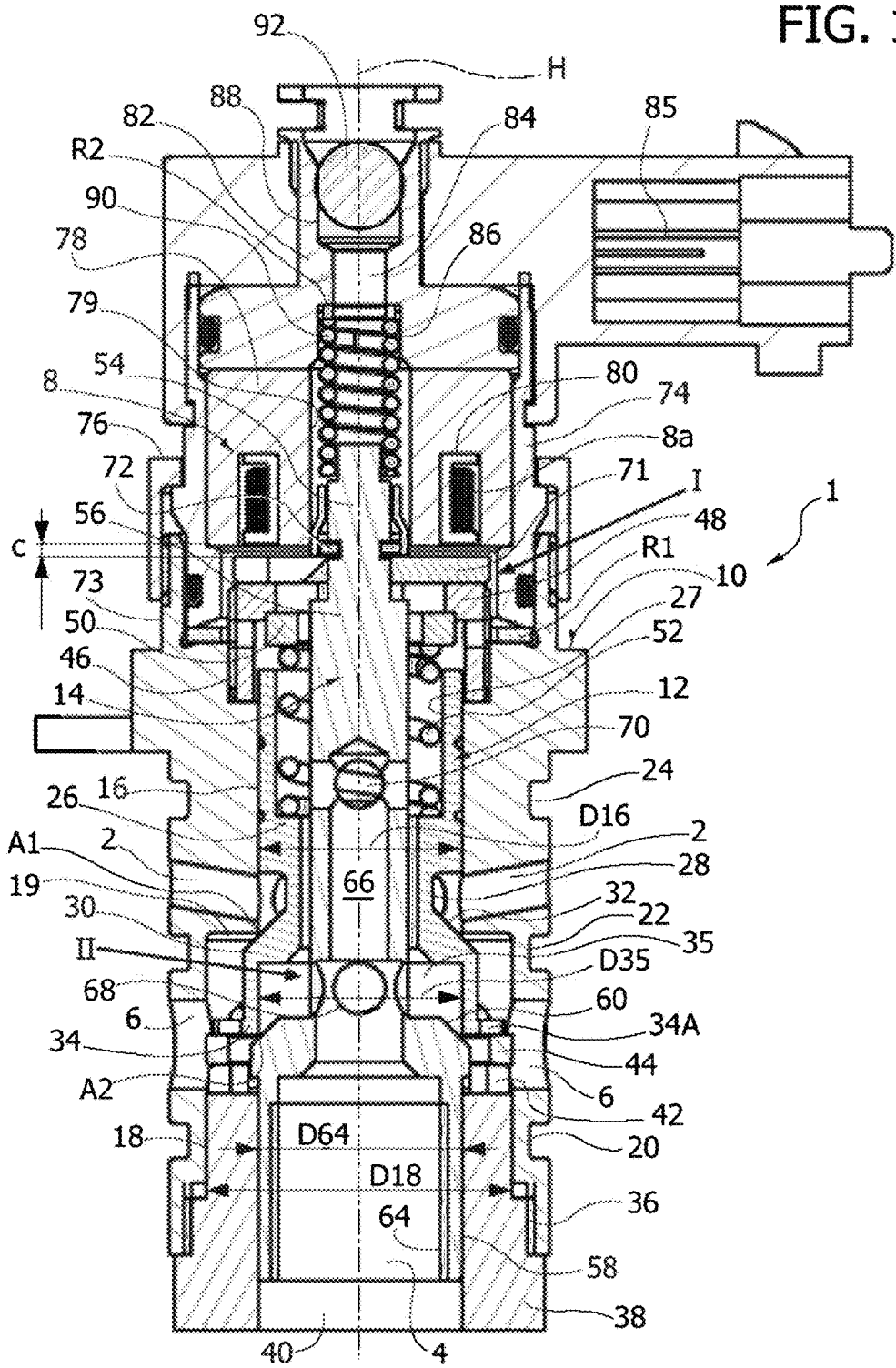
FIG. 1A illustrates in cross section a first embodiment of a solenoid valve of the type already proposed in the European patent application No. EP 11 190 645.9 (still secret at the date of the present invention), in a first operating position.
Figure 1B:
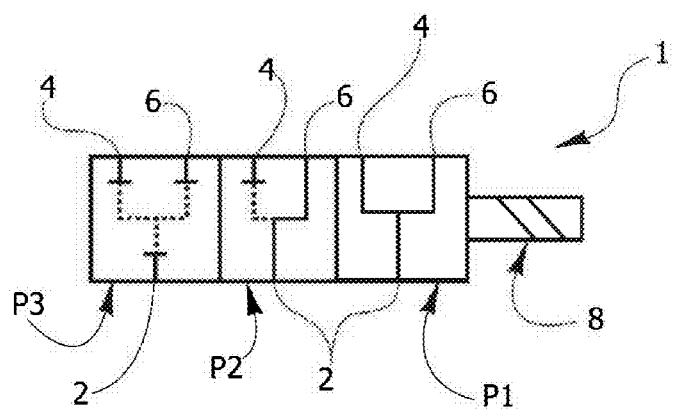
FIG. 1B illustrates a functional diagram of the solenoid valve of FIG. 1A.

With reference to the schematic representation of FIG. 1B, the solenoid valve 1 comprises a first mouth 2 for inlet of a working fluid, and a second mouth 4 and a third mouth 6 for outlet of said working fluid. In a preferred embodiment, the working fluid is oil, but the solenoid valve 1 can work in the same way with other liquids or with gaseous fluids, such as for example fuel, as described in the practical application schematically represented in FIGS. 12 and 13.

Once again with reference to FIG. 1B, the solenoid valve 1 comprises three operating positions designated by the references P1, P2, P3. An electromagnet 8 comprising a solenoid 8a can be controlled for causing a switching of the operating positions P1, P2, P3 of the solenoid valve 1, as will be described in detail hereinafter.

In the position P1 a passage of fluid from the first mouth 2 to the second mouth 4 and the third mouth 6 is enabled, in the position P2 a passage of fluid from the first mouth 2 to the third mouth 6 is enabled, whilst the passage of fluid from the mouth 2 to the mouth 4 is disabled (it should be noted that the opposite connection, i.e., the hydraulic connection from the first mouth 2 to the second mouth 4 without there being a hydraulic connection between the first mouth 2 and the third mouth 6 cannot be provided by the solenoid valve according to the invention), whereas finally in the position P3 the passage of fluid from the mouth 2 to the mouths 4 and 6 is completely disabled.

Once again with reference to FIG. 1B, the dashed segments connecting the mouths 2, 4 and 6 indicate schematically the leakages of liquid through the dynamic seals provided between the moving components: said leakages (hydraulic consumption of the valve) come out of the mouth that is at a lower pressure.

With reference to FIG. 1A, the solenoid valve 1 comprises a plurality of components coaxial to one another and sharing a main axis H. In particular, the solenoid valve 1 comprises a jacket 10, housed in which are a first open/close element 12 and a second open/close element 14 and the electromagnet 8 containing the solenoid 8a. Moreover provided on the jacket 10 are the mouths 2, 6, whereas, as will emerge more clearly from the ensuing description, the mouth 4 is provided by means of the open/close element 14 itself.

The jacket 10 is traversed by a through hole sharing the axis H and comprising a first stretch 16 having a first diameter D16 and a second stretch 18 comprising a diameter D18, where the diameter D18 is greater than the diameter D16. At the interface between the two holes there is thus created a shoulder 19.

The mouths 2, 6 are provided by means of through holes with radial orientation provided, respectively, in a position corresponding to the stretch 16 and to the stretch 18 and in communication therewith.

Moreover provided on an outer surface of the jacket 10 are a first annular groove 20, a second annular groove 22, and a third annular groove 24, each of which are designed to receive a gasket of an O-ring type, arranged on opposite sides with respect to the radial holes that define the mouth 2 and to the radial holes that define the mouth 6.

In particular, the mouth 6 is comprised between the grooves 20 and 22, whereas the mouth 2 is comprised between the grooves 22 and 24.

Preferably, the three annular grooves 20, 22, 24 are provided with the same seal diameter so as to minimize the unbalancing induced by the resultant of the pressure forces acting on the outer surface of the jacket 10, which otherwise would be such as to jeopardize fixing of the jacket of the solenoid valve in the corresponding seat provided on a component or in an oleodynamic circuit where it is installed.

The first valve element 12 is basically configured as a hollow tubular element comprising a stem 26—which is hollow and provided in which is a first cylindrical recess 27—, a neck 28, and a head 30, which has a conical contrast surface 32 and a collar 34. The neck 28 has a diameter smaller than that of the stem 26.

Moreover, preferably provided in the collar 34 is a ring of axial holes 34A, whilst a second cylindrical recess 35 having a diameter D35 is provided in the head 30.

The stem 26 of the valve element 12 is slidably mounted within the stretch 16 in such a way that the latter will function as guide element and as dynamic-sealing element for the valve element 12 itself: the dynamic seal is thus provided between the environment giving out into which is the first mouth 2 and the environment giving out into which is the second mouth 4. This, however, gives rise to slight leakages of fluid through the gaps existing between the valve element 12 and the stretch 16: the phenomenon is typically described as "hydraulic consumption" of the solenoid valve, and depends upon the difference in pressure between the environments straddling the dynamic seal itself, upon geometrical parameters of the gaps (in particular the axial length, linked to the length of the stem 26, and the diametral clearance) and, not least, by the temperature of the fluid, which as is known determines the viscosity thereof.

The axial length of the stem 26 is chosen in such a way that it will extend along the stretch 16 as far as the holes that define the mouth 2, which thus occupy a position corresponding to the neck 28 that provides substantially an annular fluid chamber.

The head 30 is positioned practically entirely within the stretch 18, except for a small surface portion 32 that projects within the stretch 16 beyond the shoulder 19. In fact, the head 30 has a diameter greater than the diameter D16 but smaller than the diameter D18, so that provided in a position corresponding to the shoulder 19 is a first contrast seat A1 for the valve element 12, in particular for the conical surface 32.

In a variant of the solenoid valve of FIG. 1A, in a region corresponding to the shoulder 19 an annular chamfer is made that increases the area of contact with the conical surface 32 at the same time reducing the specific pressure developed at the contact therewith, hence minimizing the risks of damage to the surface 32. It in any case important for the seal diameter between the valve element 12 and the shoulder 19 to be substantially the same as the diameter D16.

Provided at a first end of the jacket 10 is a first threaded recess 36 engaged in which is a bushing 38 having a through guide hole 40 sharing the axis H. The diameter of the hole 40 is equal to the diameter D35 for reasons that will emerge more clearly from the ensuing description.

The bushing 38 comprises a castellated end portion 42, which functions as contrast element for a spacer ring 44.

The spacer ring 44 offers in turn a contrast surface to the head 30 of the valve element 12, in particular to the collar 34. In addition, the choice of the thickness of the spacer ring 44 enables adjustment of the stroke of the valve element 12 and hence of the area of passage between the mouth 2 and the mouth 6.

Provided at a second end of the jacket 10, opposite to the first end, is a second threaded recess 46, engaged in which is a ringnut 48. The ringnut 48 functions as contrast for a ring 50, which in turn offers a contrast surface for a first elastic-return element 52 housed in the cylindrical recess 27.

The ringnut 48 is screwed within the threaded recess 46 until it comes to bear upon the shoulder between the latter and the jacket 10: in this way, the adjustment of the pre-load applied to the elastic-return element 52 is determined by the thickness (i.e., by the band width) of the ring 50.

The second valve element 14 is set inside the stem 26 and is slidable and coaxial with respect to the first valve element 12.

The valve element 14 comprises:
a terminal shank 54 at a first end thereof,
a stem 56, and
a head 58, set at a second end thereof, having a conical contrast surface 60 and a cup-shaped end portion 64, in which the head 58 and the shank 54 are connected by the stem 56.

It should moreover be noted that the geometry of the castellated end 42 contributes to providing, by co-operating with the holes 34a, a passageway for the flow of fluid that is sent on through the section of passage defined between the conical surface 60 and the contrast seat A2 towards the second mouth 4.

The cup-shaped end portion 64 has an outer diameter D64 equal to the diameter of the hole 40 and comprises a recess that constitutes the outlet of a central blind hole 66 provided in the stem 56. The hole 66 intersects a first set of radial holes and a second set of radial holes, designated, respectively, by the reference numbers 68, 70. In this embodiment the two sets each comprise four radial holes 68, 70 set at the same angular distance apart.

The position of the aforesaid sets of radial holes is such that the holes 68 are located substantially in a position corresponding to the cylindrical recess 35, whilst the holes 70 are located substantially in a position corresponding to the cylindrical recess 27.

Coupling between the cup-shaped end portion 64 (having a diameter D64) and the hole 40 (having a diameter substantially equal to the diameter D64) provides a dynamic seal between the valve element 14 and the bushing 38: this seal separates the environment giving out into which is the third mouth 6 from the environment giving out into which is the second mouth 4. In a way similar to what has been described for the dynamic seal provided between the mouths 2 and 6, the hydraulic consumption depends not only upon the temperature and the type of fluid, but also upon the difference in pressure existing between the environments giving out into which are the mouths 2 and 4, upon the diametral clearance, upon the length of the coupling between the cup-shaped end portion 64 and the bushing 38, and upon other parameters such as the geometrical tolerances and the surface finish of the various components. The hydraulic consumptions of the two dynamic seals add up and define the total hydraulic consumption of the solenoid valve 1.

Fitted on the terminal shank 54 is an anchor 71 provided for co-operating with the solenoid 8, which has a reference position defined by a half-ring 72 housed in an annular groove on the shank 54; advantageously, the anchor 71 can be provided as a disk comprising notches with the dual function of lightening the overall weight thereof and of reducing onset of parasitic currents.

Provided at a second end of the jacket 10, opposite to the one where the bushing 38 is located, is a collar 73 inserted within which is a cup 74, blocked on the collar 73 by means of a threaded ringnut 76 that engages an outer threading made on the collar 73.

Set in the cup 74 is a toroid 78 housing the solenoid 8, which is wound on a reel 80 housed in an annular recess of the toroid 78 itself. The toroid 78 is traversed by a through hole 79 sharing the axis H and is surmounted by a plug 82 bearing thereon and blocked on the cup 74 by means of a cap 84 bearing a seat for an electrical connector 85 and electrical connections (not visible) that connect the electrical connector to the solenoid 8.

The toroid 78 comprises a first base surface, giving out on which is the annular recess 79, which offers a contrast to the anchor 71, determining the maximum axial travel thereof (i.e., the stroke), designated by c. The maximum axial travel of the anchor 71 is hence determined by subtracting the thickness of the anchor 71 itself (i.e., the band width thereof) from the distance between the first base surface of the toroid 78 and the ringnut 48. In order to adjust the stroke c of the anchor 71 a first adjustment shim R1 is provided, preferably provided as a ring having a calibrated thickness; alternatively, it is possible to replace the anchor 71 with an anchor of a different thickness. The stroke c of the anchor 71 is hence constituted by three components:

a first component $c_v$, which represents the loadless stroke, which terminates when the top surface of the anchor engages the half-ring 72;

a second component $\Delta h_{14}$, which corresponds to the displacement of just the second valve element 14; and a third component $\Delta_{12}$, which corresponds to the simultaneous displacement of both of the valve elements.

It should moreover be noted that the pressure of the fluid in the environment giving out into which is the mouth 4 exerts its own action also on the anchor 71, on the toroid 78, on the elastic element 90, on the ringnut 48, and on the shank 54 of the valve element 14 this entailing adoption, for protecting the electromagnet 8, of static-sealing elements.

The plug 82 comprises a through hole 84 sharing the axis H and comprising a first stretch and a second stretch with widened diameter 86, 88 at opposite ends thereof. It should be noted that the through hole 84 enables, by means of introduction of a measuring instrument, verification of the displacements of the valve element 14 during assemblage of the solenoid valve 1.

The stretch 86 communicates with the hole 79 and defines therewith a single cavity set inside which is a second elastic-return element 90, co-operating with the second valve element 14. The elastic-return element 90 bears at one end upon a shoulder made on the shank 54 and at another end upon a second adjustment shim R2 bearing upon a shoulder created by the widening of diameter of the stretch 86. The adjustment shim R2 has the function of adjustment of the pre-load of the elastic element 90.

Forced in the stretch 88 is a ball 92 that isolates the hole 84 with respect to the environment, preventing accidental exit of liquid.

All the components so far described are coaxial to one another and share the axis H.

Operation of the solenoid valve 1 is described in what follows.

In a preferred application, the solenoid valve 1 is inserted in an oleodynamic circuit in such a way that each of the mouths 2, 4, 6 is hydraulically connected to a corresponding environment, each having its own level of pressure—respectively $p_2$, $p_4$, $p_6$—and being such that $p_2 > p_6 > p_4$.

Figure 1C:
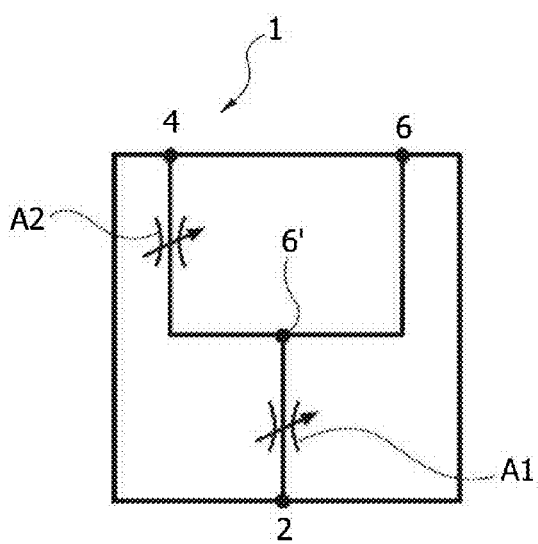
FIG. 1C illustrates a single-line schematic representation of the solenoid valve of FIG. 1A in a generic operating position.
Figure 1D:
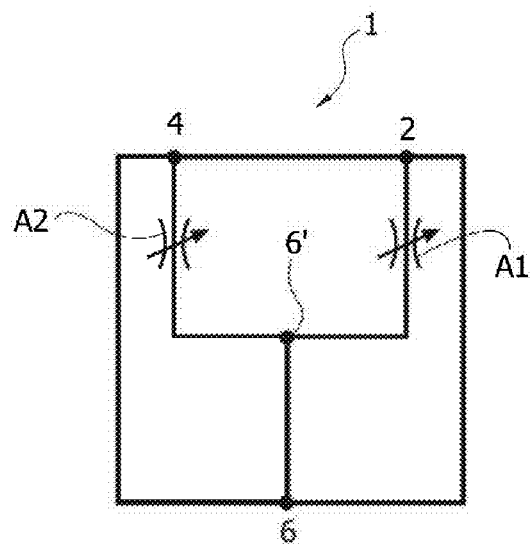
FIG. 1D illustrates variant of the diagram of FIG. 1C.

FIG. 1C shows a single-line diagram that illustrates the solenoid valve 1 in a generic operating position: it should be noted how arranged between the first mouth 2 and the second mouth 4 are two flow restrictors with variable cross section A1 and A2, which represent schematically the passage ports provided by the first and second valve elements.

In the node between the mouths 2, 4 and 6, designated by 6', the value of the pressure is equal to that at the third mouth 6 but for the pressure drops along the branch 6-6'. Set between the mouth 4 and the node 6' is the flow restrictor A2, which represents schematically the action of the second valve element 14. Likewise, set between the mouth 2 and the node 6' is the flow restrictor with variable cross section A1, which represents schematically the action of the first valve element 12.

The positions P1, P2, P3 correspond to particular values of the section of passage of the flow restrictors A1, A2, in turn corresponding to different positions of the valve elements 12, 14, as will emerge more clearly from the ensuing description. In particular:

position P1: A1, A2 have a maximum area of passage;

position P2: A1 has a maximum area of passage, A2 has a zero area of passage;

position P3: A1, A2 have a zero area of passage.

FIG. 1A illustrates the first operating position P1 of the solenoid valve 1, in which the first and second valve elements 12, 14 are in the resting position. This means that no current traverses the solenoid 8 and no action is exerted on the anchor 71, so that the valve elements 12, 14 are kept in position by the respective elastic-return elements 52, 90.

In particular, the first valve element 12 is kept bearing upon the ring 44 by the first elastic-return element 52, whilst the second valve element 14 is kept in position thanks to the anchor 71: the second elastic-return element 90 develops its own action on the shank 54, and said action is transmitted to the anchor 71 by the half ring 72, bringing the anchor 71 to bear upon the ringnut 48.

In this way, with reference to FIG. 1A (without neglecting the corresponding schematic representation of FIGS. 1B and 1C), the passage of fluid from the inlet mouth 2 to the first outlet mouth 4 and to the second outlet mouth 6 is enabled. In fact, the fluid entering the radial holes that define the mouth 2 invades the annular volume around the neck 28 of the first valve element 12 and traverses a first gap existing between the conical surface 32 and the first valve seat A1.

In said annular volume there is set up, on account of the head losses due to traversal of the radial holes that define the mouth 2, a pressure $p_6' > p_4$. In this way, the fluid proceeds spontaneously along its path towards the mouth 4 traversing the second gap set between the conical surface 60 and the second valve seat A2.

In this way, the fluid can invade the cylindrical recess 35 and pass through the holes 68, invading the cup-shaped end portion 64 and coming out through the hole 40; it should be noted that the pressure that is set up in the volume of the cylindrical recess 35 is slightly higher than the value $p_4$ by virtue of the head losses due to traversal of the holes 68. Finally, it should be noted that the valve element 12 itself and the guide bushing 38 define the second mouth 4.

Figure 4A:
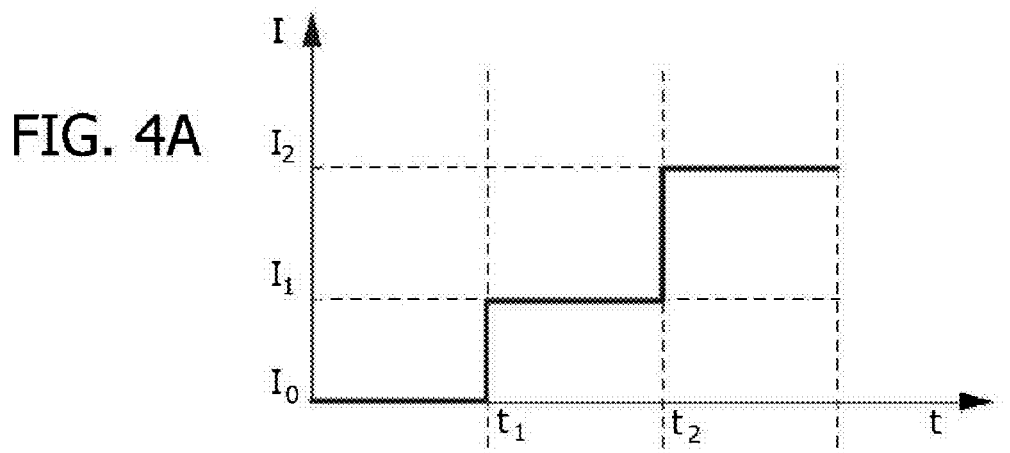
FIG. 4 comprises a first portion 4A, a second portion 4B, and a third portion 4C, representing the plots of various characteristic quantities of operation of the solenoid valve according to the invention.
Figure 4B:
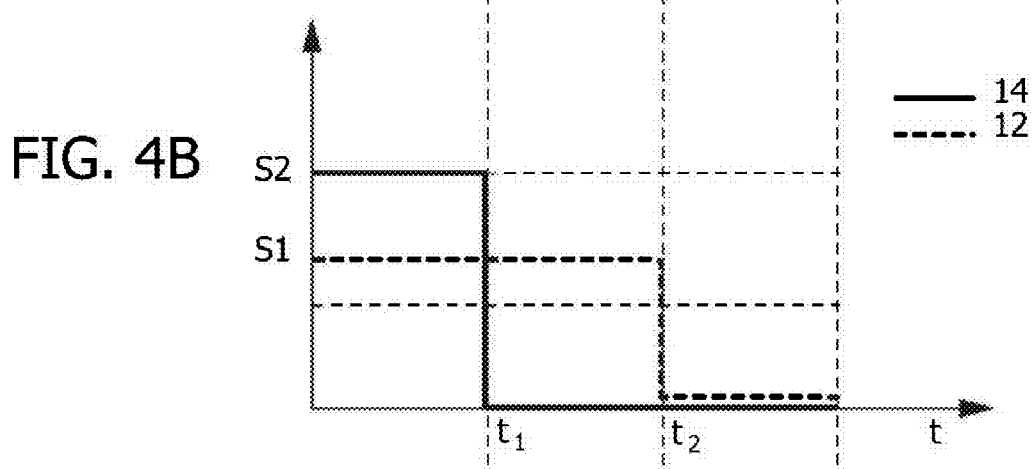
Figure 4C:
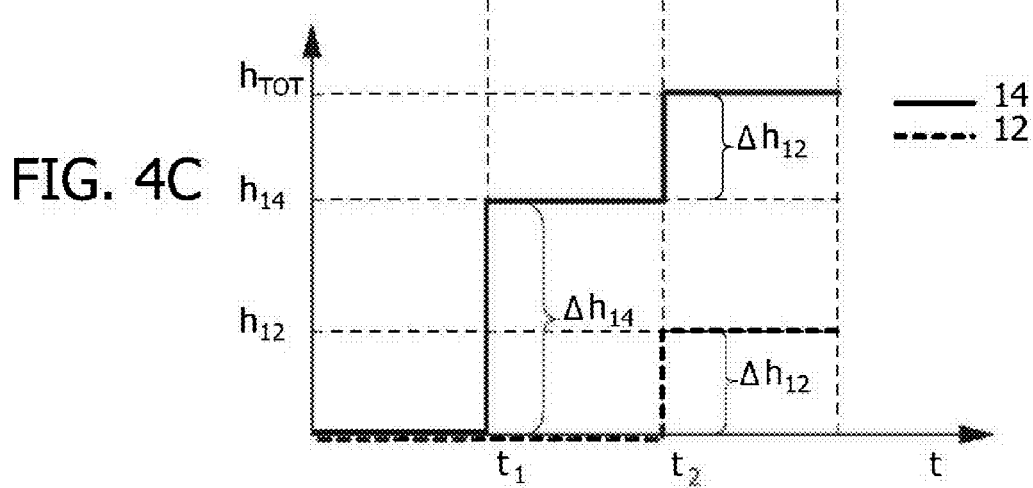

The diagrams of FIGS. 4A, 4B and 4C represent the time plots of various operating quantities of the solenoid valve 1, observed in particular during a time interval in which two events of switching of the operating position of the solenoid valve 1 occur.

The diagram of FIG. 4A illustrates the time plot of a current of energization of the solenoid 8, the diagram of FIG. 4B illustrates the time plot of the area of passage for the fluid offered by the sections of passage created by the valve elements 12, 14 co-operating with the respective valve seats A1, A2, and the diagram of FIG. 4C illustrates the plot of the (partial) absolute displacements $h_{12}$, $h_{14}$ of the valve elements 12, 14, having assumed as reference (zero displacement) the resting position of each of them. The reference $h_{TOT}$ indicates the overall displacement of the valve element 14, equal to the sum of the displacement $h_{12}$ and of the partial displacement $h_{14}$ (the anchor will, instead, shift by $h_{TOT}+c_v$).

Corresponding to the operating position P1 illustrated in FIG. 1 is a current of energization of the solenoid 8 having intensity L with zero value (FIG. 4A).

At the same time, with reference to FIG. 4B, in the operating position P1 the second valve element 14 defines with the valve seat A2 a gap having area of passage S2, whereas the first valve element 12 defines with the valve seat A1 a gap having area of passage S1, which in this embodiment is smaller than the area S2. The function of dividing the total stroke $h_{tot}$ into the two fractions $\Delta h_{12}$ and $\Delta h_{14}$ is entrusted to the shim 44.

In addition, with reference to FIG. 4C, in the operating position P1 the displacements of the valve elements 12, 14 with respect to the respective resting positions are zero.

Figure 2A:
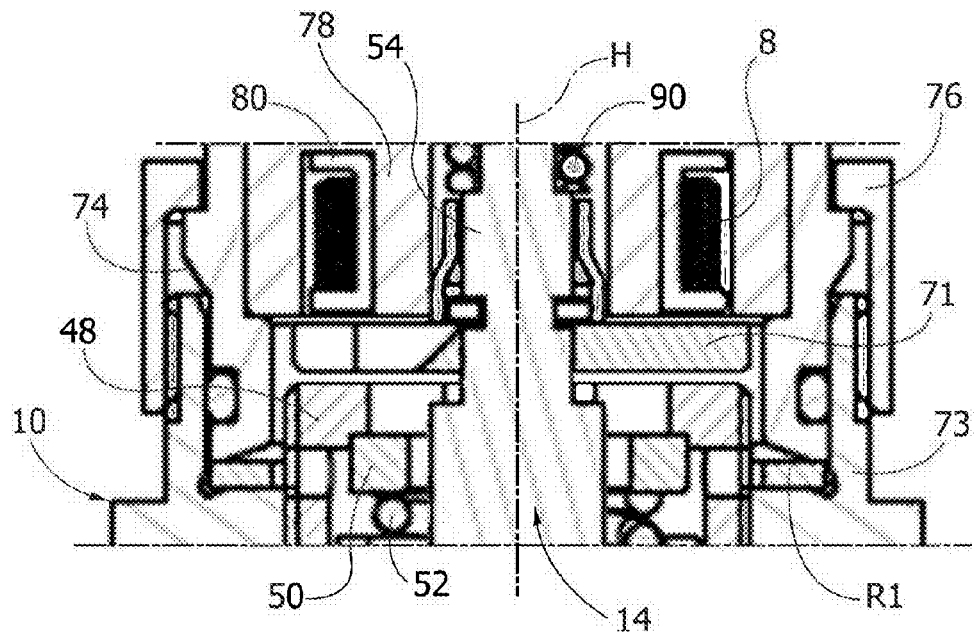
FIG. 2 comprises a first portion 2A and a second portion 2B, illustrating two enlargements of details indicated by the arrows I and II in FIG. 1A and referring to a second operating position of the solenoid valve of FIG. 1A.
Figure 2B:
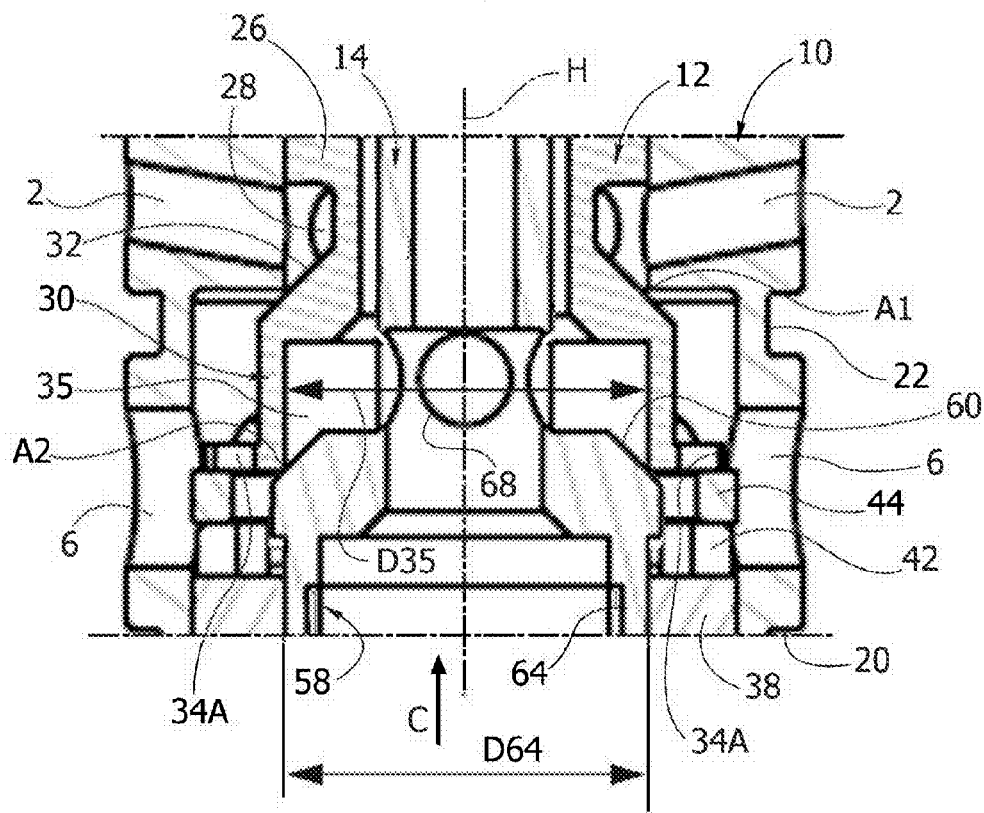

With reference to FIGS. 2A, 2B, the enlargements illustrate in detail the configuration of the valve elements in the operating position P2.

The operating position P2 is activated following upon a first event of switching of the solenoid valve 1 that occurs at an instant $t_1$ in which an energization current of intensity $I_1$ is supplied to the solenoid 8.

The intensity $I_1$ is chosen in such a way that the action of attraction exerted by the solenoid 8 on the anchor 71 will be such as to overcome the force developed by the elastic-return element 90 alone. In other words, the solenoid 8 is actuated for impressing on the second valve element a first movement $\Delta h_{14}$ in an axial direction H having a sense indicated by C in FIG. 2 whereby the second valve element, in particular the conical surface 60, is brought into contact with the second valve seat A2 disabling the passage of fluid from the first mouth 2 to the second mouth 4, and hence providing a transition from the first operating position P1 to the second operating position P2.

With reference to the diagrams of FIG. 4, the above is equivalent to a substantial annulment of the area of passage S2 and to a displacement $\Delta h_{14}$ of the valve element 14 in an axial direction and with sense C. The anchor 71 is detached from the ringnut 48 and substantially occupies an intermediate position between this and the toroid 78.

It should be noted that the movement of the valve element 14 stops in contact with the valve seat A2 since, in order to proceed, it would be necessary to overcome also the action of the elastic element 52, which is impossible with the energization current of intensity $I_1$ that traverses the solenoid 8.

The valve element 14 (as likewise the valve element 12, see the ensuing description) is moreover hydraulically balanced; consequently, it is substantially insensitive to the values of pressure with which the solenoid valve 1 operates.

By "hydraulically balanced" referred to each of the valve elements 12, 14 is meant that the resultant in the axial direction (i.e., along the axis H) of the forces of pressure acting on the valve element is zero. This is due to the choice of the surfaces of influence on which the action of the pressurized fluid is exerted and of the dynamic-seal diameters (in this case also guide diameters) of the valve elements. In particular, the dynamic-seal diameter of the valve element 14 is the diameter D64, which is identical to the diameter D35 of the cylindrical recess 35, which determines the seal surface of the valve element 14 in a region corresponding to the valve seat A2 provided on the valve element 12.

The same applies to the valve element 12, where the dynamic-seal diameter is the diameter D16, which is equal to the diameter of the stem 26 (but for the necessary radial plays) and coincides with the diameter of the valve seat A1, provided on the jacket 10, which determines the surface of influence of the valve element 12.

In a particular variant, it is possible to design the solenoid valve 1 in such a way that the diameters D64 and D35 associated to the valve element 14 are substantially equal to the diameter D16 and to the diameter of the seat A1 of the valve element 12.

Figure 3A:
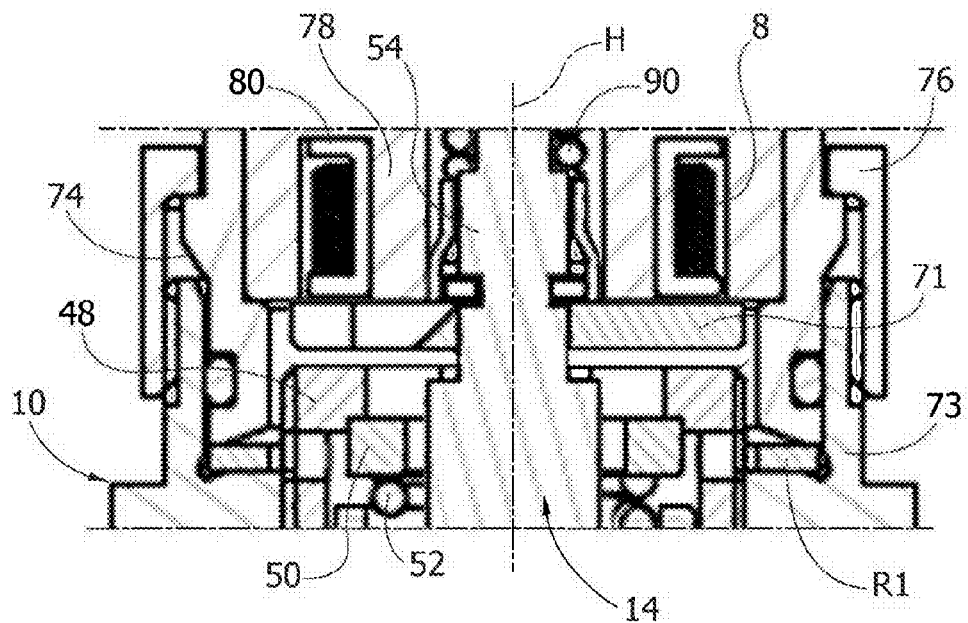
FIG. 3 comprises a first portion 3A and a second portion 3B, illustrating two enlargements of details indicated by the arrows I and II in FIG. 1 and referring to a third operating position of the solenoid valve according to the invention.
Figure 3B:
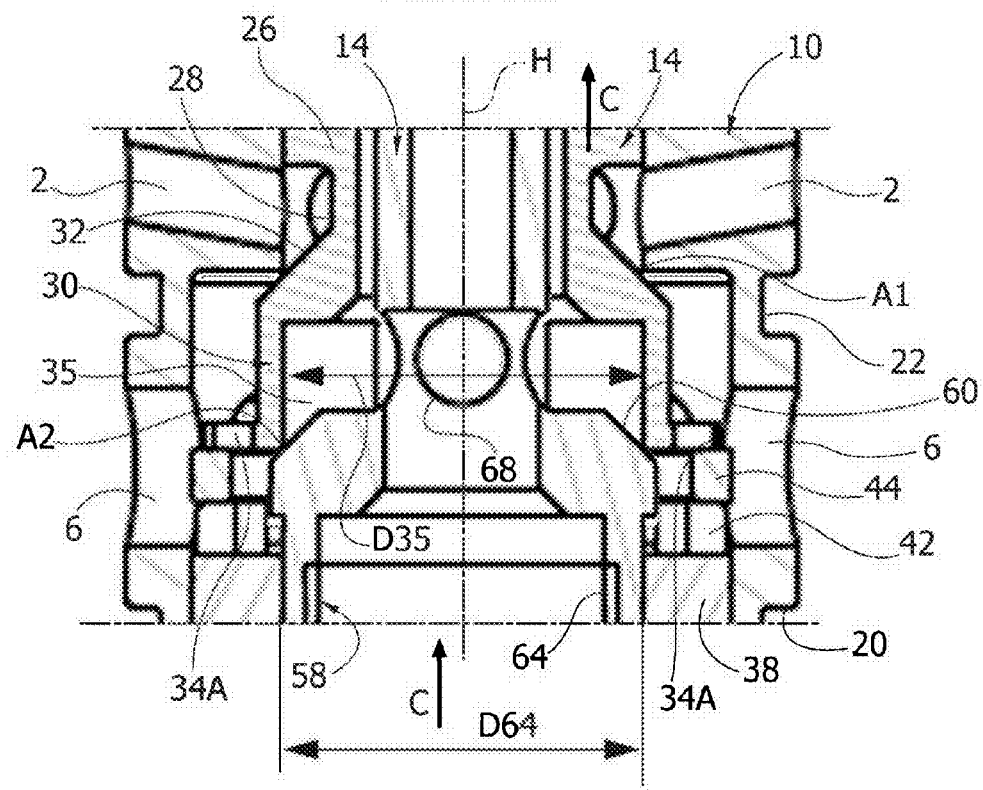

The configuration of the valve elements 12, 14 in the third operating position P3 is illustrated in FIGS. 3A-3B. With reference moreover to FIGS. 4A to 4C, at an instant $t_2$, a command is issued for an increase in the energization current that traverses the solenoid 8, which brings the intensity thereof from the value $I_1$ (kept throughout the time that elapses between $t_1$ and $t_2$) to a value $I_2 > I_1$.

This causes an increase of the force of attraction exerted by the solenoid 8 on the anchor 71, whereby impressed on the second valve element 14 is a second movement, subsequent to the first movement, thanks to which the second valve element 14 draws the first valve element 12 into contact against the first contrast surface A1, hence disabling the passage of fluid from the mouth 2 to the mouth 6. In fact, there is no longer any gap through which the fluid that enters the mouth 2 can flow towards the mouth 6. The diagram of FIG. 4B is a graphic illustration of the annulment of the section of passage S1 at the instant $t_2$.

It should be noted that—on account of what has been described previously—during the aforesaid second movement, in which the valve element 12 is guided by the bushing 38, the second valve element 14 remains in contact with the first valve element 12 maintaining the passage of fluid from the mouth 2 to the mouth 4 disabled. The corresponding displacement of the valve element 14, which is the same as the one that the valve element 12 undergoes (both of them in the sense C and in the axial direction), is designated by $\Delta h_{12}$ in FIG. 4C.

There is thus obtained a transition from the second operating position P2 to the third operating position P3, in which, in effect, the environments connected to each of the mouths of the solenoid valve 1 are isolated from one another, except for the flows of fluid that leak through the dynamic seals towards the environment with lower pressure, i.e., towards the second mouth 4. In the design stage, the dynamic seals are conceived in such a way that any leakage of fluid is in any case negligible with respect to the one that can be measured when the solenoid valve is in the operating positions P1 and/or P2.

The higher intensity of current that circulates in the solenoid 8 is necessary to overcome the combined action of the elastic-return elements 90 and 52, which tend to bring the respective valve elements 14, 12 back into the resting position.

It should be noted that also in this circumstance, given that the valve element 12 is hydraulically balanced, the action of attraction developed on the anchor 71 must overcome only the return force of the springs 90, 52, in so far as the dynamic equilibrium of the valve elements 12, 14 is indifferent to the action of the pressure of the fluid, given that said valve elements are hydraulically balanced.

It is in this way possible to choose a solenoid 8 of contained dimensions and it is thus possible to work with contained energization currents and with times of switching between the various operating positions of the solenoid valve contained within a few milliseconds, with a pressure $p_2$, for example, in the region of 400 bar. Other typical pressures for the environment connected to the mouth for inlet of the fluid are 200 and 300 bar (according to the type of system).

With reference to FIG. 5, an application of the solenoid valve 1 to an anti-lock braking system (ABS) of a motor vehicle is illustrated by way purely of example.

Figure 5A:
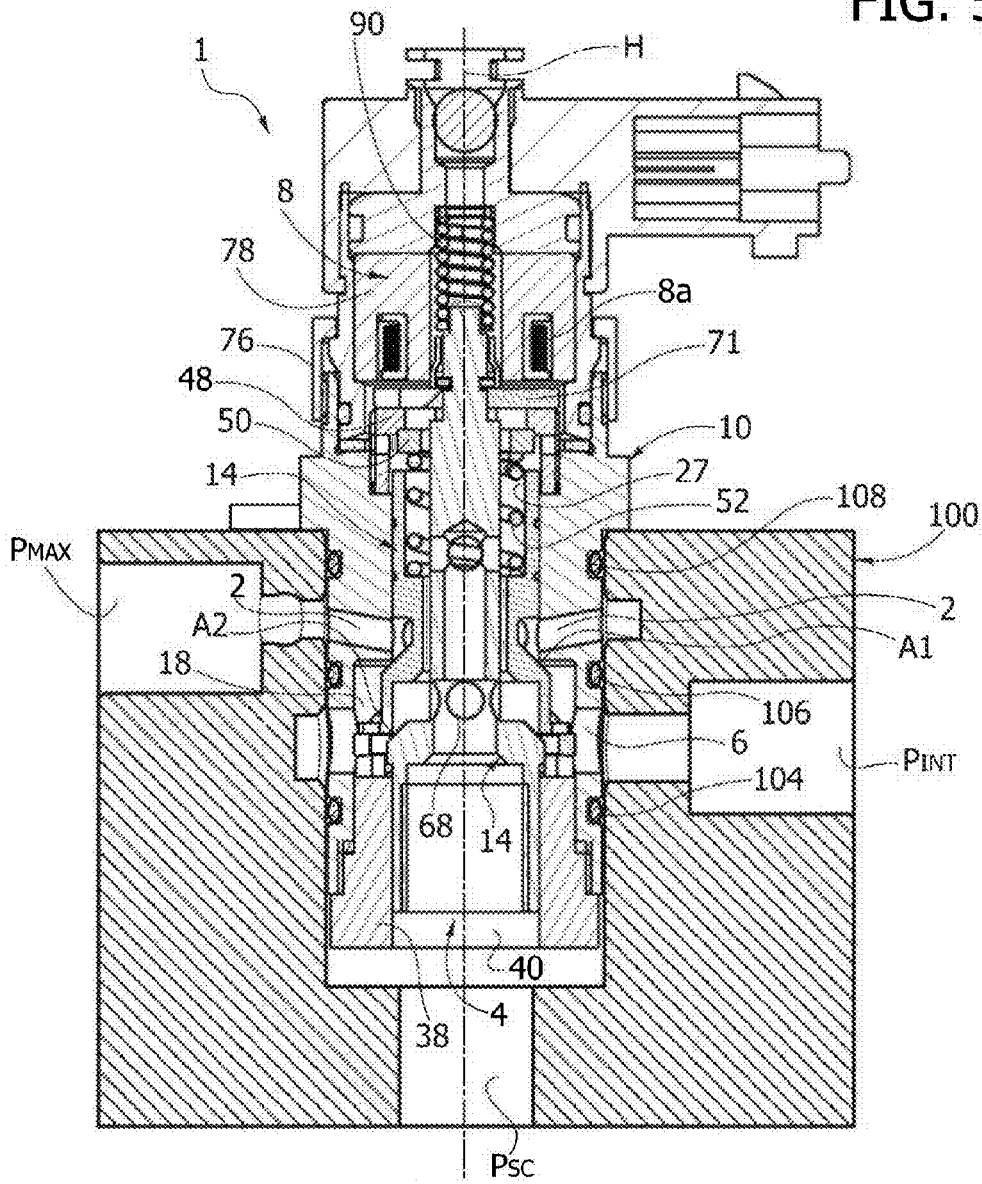
FIG. 5 comprises a first portion 5A illustrating in cross section an example of installation of the solenoid valve of FIG. 1 and a second portion 5B illustrating a hydraulic diagram of a possible application of the solenoid valve according to the invention.

With reference to FIG. 5A, the solenoid valve 1, which in the embodiment described is of the so-called "cartridge" type, is inserted into a body 100—which functions as connection element—communicating with a first environment, a second environment, and a third environment designated by the references VC, V1, V2. The environments VC, V1, V2 are, respectively, at a level of pressure $p_{MAX}$ (or control pressure), $P_{INT}$ (intermediate pressure), and $p_{SC}$ (exhaust pressure), lower than the intermediate pressure $P_{INT}$.

It should moreover be noted that the solenoid valve 1 is inserted in the body 100 in a seat 102 in which there is a separation of the levels of pressure associated to the individual environments by means of three gaskets of an O-ring type housed, respectively, in the annular grooves 20, 22 and 24 and designated, respectively, by the reference numbers 104, 106, 108.

In particular, the O-ring 104 guarantees an action of seal in regard to the body across the environments V2 V1, whilst the O-ring 106 guarantees an action of seal in regard to the body across the environments V1 and VC. The last O-ring, designated by the reference number 108, exerts an action of seal that prevents any possible leakage of fluid on the outside of the body.

Figure 5B:
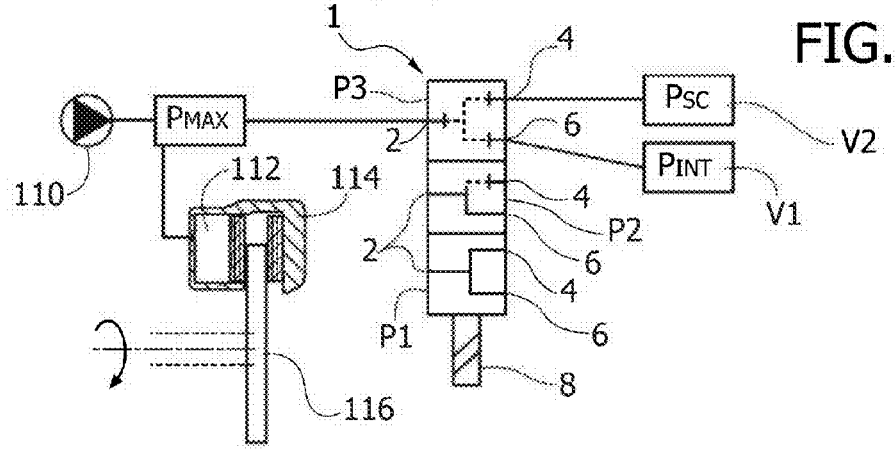

With reference to FIG. 5B, in the specific application considered, the environment VC at pressure $p_{MAX}$ is a control volume of a braking system set on a hydraulic power line that hydraulically connects a braking-liquid pump 110 to a cylinder 112 of a brake calliper 114, here represented as being of a floating type but the same applies to callipers of a fixed type.

The calliper 114 exerts its own action on a disk 116, connected in rotation to the wheel of a vehicle.

The control volume VC is hydraulically connected to the inlet mouth 2 of the solenoid valve 1, whilst connected to the second and third mouths 4, 6 of the solenoid valve 1 are the environments V2 and V1, respectively, where the environment V1 is functionally a further control volume kept at a level of pressure lower than the pressure $p_{MAX}$ that obtains in the control volume VC during braking, whilst the environment V2 coincides with an exhaust environment, in which the relative pressure is substantially zero.

In normal operating conditions of the vehicle, in which the ABS does not intervene, the control volume VC is pressurized—during a braking action—by the action of the user, who via the hydraulic pump 110 sends pressurized fluid to the cylinder 112 causing gripping of the calliper 114 on the disk 116. The solenoid valve 1 is kept in the operating position P3, which is equivalent to a completely traditional operation of the braking system of the vehicle.

The pressure that is set up in the control volume VC is equal to the pressure of the fluid in the cylinder 112 during braking, whereas the value of intermediate pressure $p_{int}$ is modulated by means of an electronic control unit operatively connected to a regulation device (neither of which are illustrated in FIG. 5B), as a function of the boundary conditions detected by sensors in themselves known, such as, for example, icy, wet, or damp, road surface, the type of asphalt or else again the temperature of the disks 116.

In the case where the sensors of the ABS, in themselves known, detect locking of the wheels of the vehicle during braking, the system intervenes and performs its own function by exploiting the switching of the operating positions of the solenoid valve 1 to modulate the braking action.

In particular, the solenoid valve 1 is switched into the position P1 in the case where a control unit of the ABS determines the need for a practically total release of the braking action on the disk 116 or when the braking action impressed by the user ceases.

In this case, in fact, the control volume VC, and consequently the cylinder 112, would be hydraulically connected to the environment V2, thus setting it in the discharging condition.

In the case where the aforesaid control unit of the ABS determines that there is the need for a partial restoring (or, if there has not been a total release of the braking action, it determines that there is the need for a partial release) of the braking action on the disk 116, the electromagnet 8 is controlled so as to switch the solenoid valve into the operating position P2, in which the control volume VC is hydraulically connected to the volume at intermediate pressure V1 and is isolated from the exhaust environment V2.

In this case, the control volume VC is depressurized, causing a partial release of the action on the disk 116. Finally, should the electronic control unit of the ABS determine that it is necessary to restore the maximum braking action on the disk 116, the solenoid 8 is governed so as to switch the solenoid valve again into the position P3.

Of course, it is possible to exploit the potentialities of modern electronic control units so as to impart high-frequency signals to the solenoid valve 1 obtaining switchings that are very fast, i.e., with frequencies typical of ABSs.

Moreover, the application of the solenoid valve 1 to a braking system entails a second advantage: in fact, for what has been described previously, it is not possible to make a direct switching from the operating position P3 to the operating position P1, which imposes on the solenoid valve to assume, albeit for an extremely short time interval, the operating position P2. This results in a more gradual deceleration during release of the brake.

It should be noted that in said perspective, it is extremely important for the valve elements 12 and 14 to be hydraulically balanced, in so far as, if it were not so, there would be the need for forces of actuation that would be too high to guarantee the required dynamics, which in turn would entail an oversizing of the components (primarily, the solenoid 8)

in addition to a dilation of the switching times, which might not be compatible with constraints of space and with the operating specifications typical of the systems discussed herein.

Of course, the details of construction and the embodiments may vary widely with respect to what is described and illustrated.

For example, the seals between the valve elements 12, 14 and the respective valve seats A1, A2 can be provided by means of the contact of two conical surfaces, where the second conical surface replaces the sharp edges of the shoulders on which the valve seats are provided.

Moreover, in the case where the working fluid is of a gaseous type or in the case where the application for which the solenoid valve is designed does not admit of any hydraulic consumption (or, likewise, in the case where a total lack of hydraulic communication between the various environments giving out into which are the various mouths of the solenoid valve is required), as an alternative to the dynamic seals provided by means of radial clearance between the moving elements described previously, it is possible to adopt dynamic-seal rings, in themselves known and specific for use with gaseous fluids.

For example, the rings can be of a self-lubricating type, hence with a low coefficient of friction, so as not to introduce high forces of friction and not to preclude operation of the valve itself.

Figure 6:
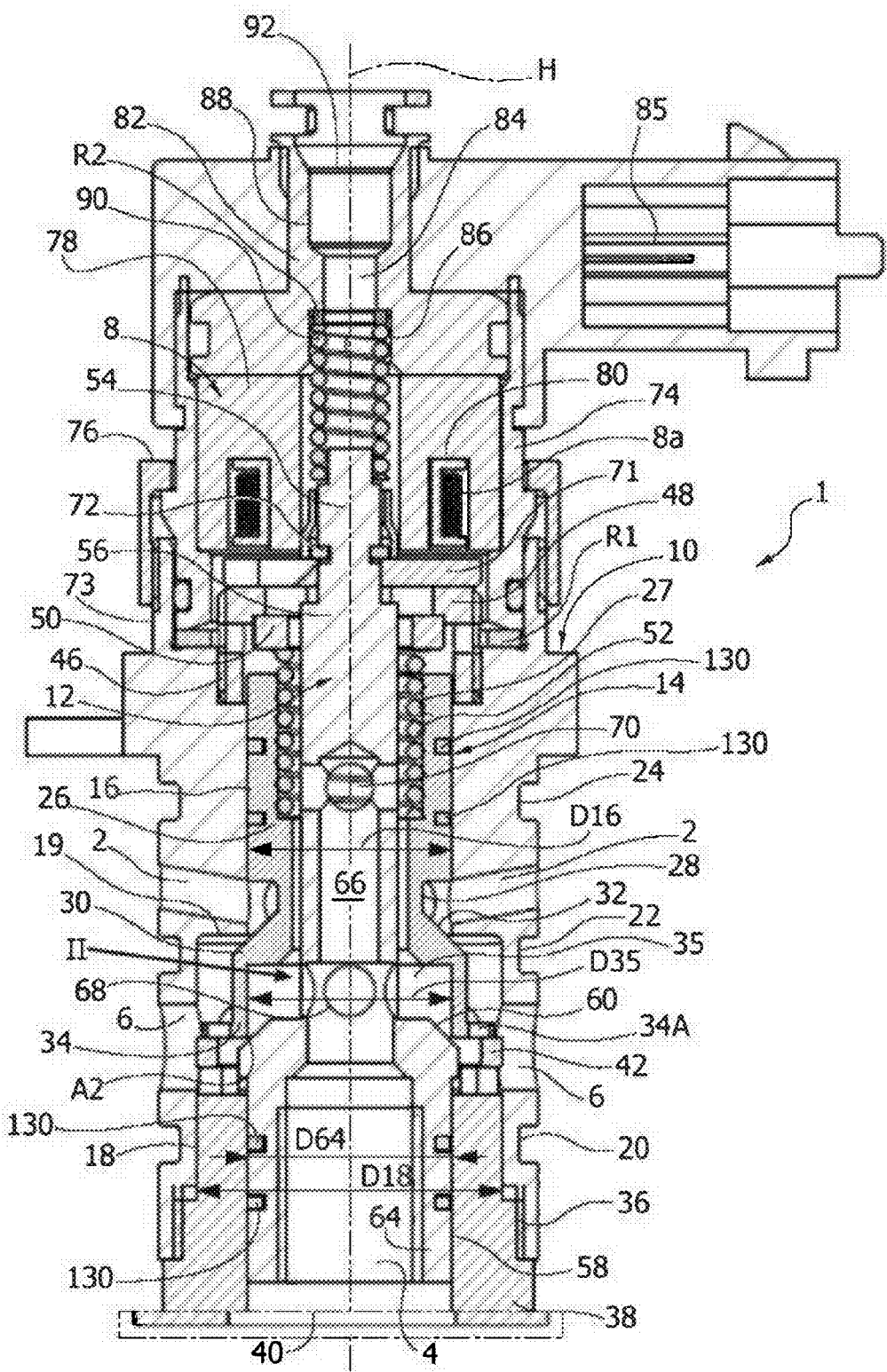
FIGS. 6 and 7 illustrate two variants of the solenoid valve of FIG. 1A.

FIG. 6 illustrates, by way of example, an embodiment of the solenoid valve 1 that envisages use of dynamic-seal rings designated by the reference number 130.

In the example of application described here, there is assumed the hydraulic connection of the second mouth 4 with an environment with minimum pressure (typically an exhaust environment) and the hydraulic connection of the third mouth 6 with an environment with a pressure intermediate between the value of the pressure $p_2$ and the value of the pressure P4.

If the connection of the mouths 4 and 6 to the respective environments is reversed, i.e., if the mouth 4 is connected to an environment at intermediate pressure and the mouth 6 to an environment at minimum pressure, the behaviour of the solenoid valve 1 varies.

In particular, in the operating position P1 of the solenoid valve, as previously defined, the environment connected to the first mouth 2 and the environment connected to the second mouth 4 will be set in the discharging condition towards the environment connected to the third mouth 6 and the leakages of fluid will have a direction such as to flow from the environment connected to the mouth 4 to the environment connected to the mouth 6.

By switching the solenoid valve 1 from the operating position P1 to the operating position P2, the environment connected to the second mouth 4 is excluded, while there remains only the hydraulic connection of the inlet environment connected to the first mouth 2 with the mouth 6, i.e., with the exhaust: as compared to the previous operating position, the flowrate measured at outlet from the mouth 6 will be lower than in the previous case, since the contribution of the flow from the mouth 4 to the mouth 6 ceases.

Finally, by switching the solenoid valve 1 from the operating position P2 to the operating position P3, also the hydraulic connection between the environment connected to the mouth 2 and the environment connected to the mouth 6 will be disabled.

The inventors have moreover noted that it is particularly advantageous to connect the mouths 2, 4, 6 of the solenoid valve 1 between environments with pressure levels that are different again from the cases described. In particular, it is possible to connect the mouth 6 to an environment with pressure $p_6$ with $p_6 > p_4$ and $p_6 > p_2$, irrespective of the values of the pressures $p_4$ and $p_2$, in the environments connected, respectively, to the mouths 4 and 2 (this means that we may indifferently have $p_4 > p_2$ or $p_2 > p_4$). It should be noted that in this situation it is the mouth 6 that performs the function of inlet mouth for the fluid, whereas the mouths 2 and 4 function as outlet mouths for the fluid. Consequently, according to the convention so far adopted in this case the mouth 6 is the first mouth and the mouths 4, 2 are the second and third mouths, respectively. At times the correspondence will be explicitly indicated in brackets in the text, where necessary.

With this mode of connection, in the operating position P1 there hence will be a flow of fluid both from the mouth 6 to the mouth 4 and from the mouth 6 to the mouth 2; consequently, both of the environments at pressure $p_4$ and at pressure $p_2$ will be supplied.

By switching the solenoid valve 1 from the operating position P1 to the operating position P2, connection of the environment at pressure $p_4$ to the other two environments will be disabled and consequently there will be only a flow of fluid from the mouth 6 to the mouth 2. Finally, by switching the solenoid valve from the operating position P2 to the operating position P3, also the hydraulic connection between the environment at pressure $p_6$ and the environment at pressure $p_2$ (i.e., between the mouth 6 and the mouth 2) will be disabled.

It should moreover be noted that, unlike the mode of connection previously described in which the mouth 2 functions as inlet mouth for the fluid, in this case the solenoid valve 1 induces lower head losses in the current fluid that traverses it and proceeds from the mouth 6 to the mouths 2 and 4. This is represented schematically in the single-line diagram of FIG. 1D: by reversing the functions of the mouths 2 and 6, the gaps defined by the valve elements 12, 14 are arranged in parallel with respect to one another, i.e., the fluid that from the inlet mouth 6 (first mouth) proceeds towards the outlet mouths 2 (third mouth) and 4 (second mouth) must traverse a single gap, in particular the gap between the valve element 14 and the valve seat A2 for the fluid that from the mouth 6 proceeds towards the mouth 4, and the gap between the valve element 12 and the valve seat A1 for the fluid that from the mouth 6 proceeds towards the mouth 2 (the node 6' hence has substantially the same pressure as the one that impinges on the mouth 6). In the case of the connection where the mouth 2 functions as inlet mouth for the fluid (FIG. 1C), the fluid that flows towards the mouth 4 must traverse both of the gaps, with consequent higher head losses.

Figure 7:
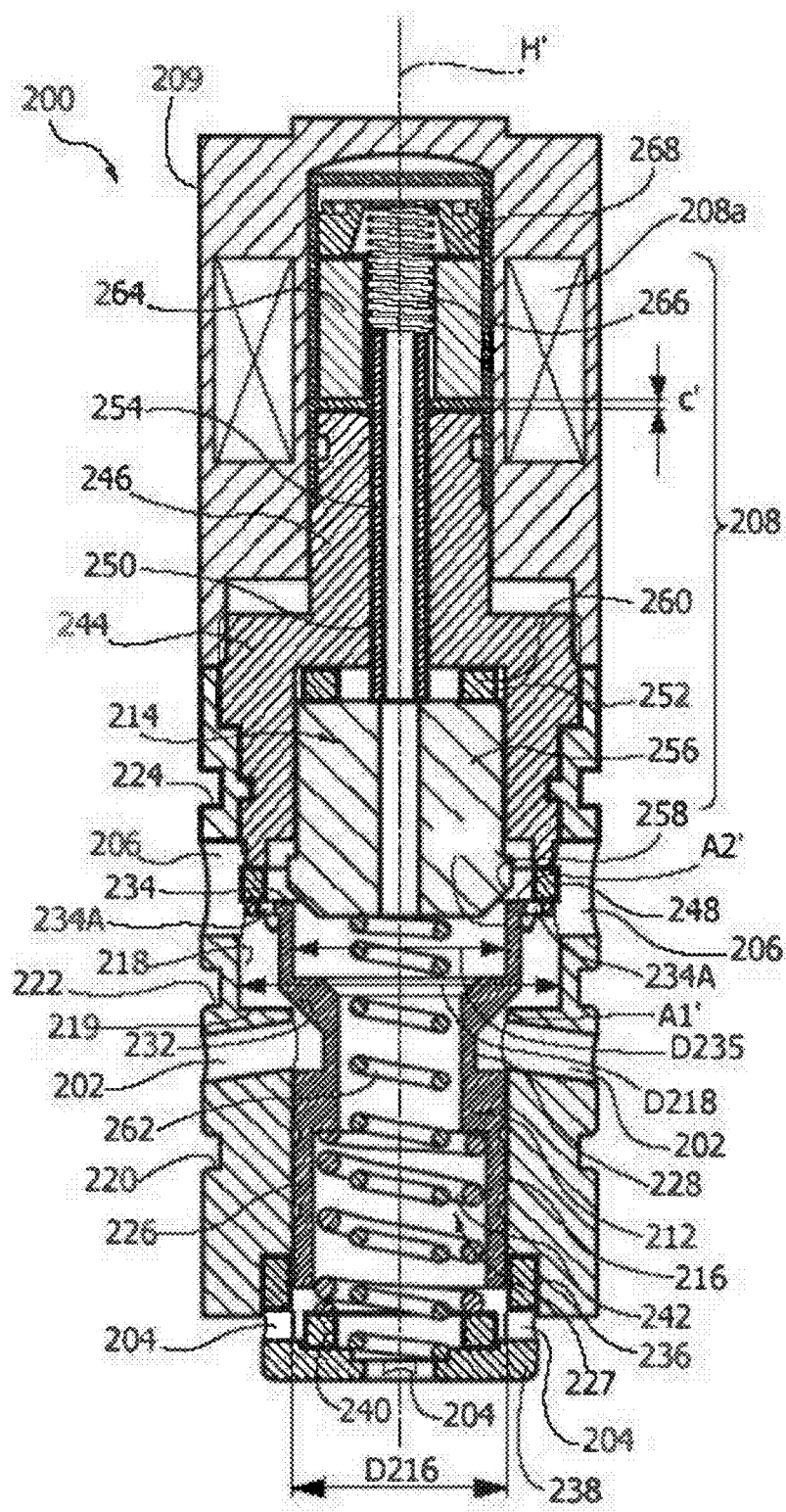

FIG. 7 illustrates a second embodiment of a solenoid valve according to the invention, which is designated by the reference number 200.

In a way similar to the solenoid valve 1, the solenoid valve 200 comprises a first mouth 202 for inlet of a working fluid, and a second mouth 204 and a third mouth 206 for outlet of said working fluid.

Once again with reference to FIG. 1B, the solenoid valve 200 can assume the three operating positions P1, P2, P3 previously described, establishing the hydraulic connection between the mouths 202, 204 and 206 as has been described previously. This means that in the position P1 a passage of fluid from the first mouth 202 to the second mouth 204 and the third mouth 206 is enabled, in the position P2 a passage of fluid from the first mouth 202 to the third mouth 206 is enabled, whilst the passage of fluid from the mouth 202 to the mouth 204 is disabled; finally, in the position P3 the passage of fluid from the mouth 202 to the mouths 204 and 206 is completely disabled.

An electromagnet 208 comprising a solenoid 208a can be driven for causing a switching of the operating positions P1, P2, P3 of the solenoid valve 200, as will be described in detail hereinafter.

With reference to FIG. 7, the solenoid valve 200 comprises a plurality of components coaxial with one another and sharing a main axis H'. In particular, the solenoid valve 200 comprises a jacket 210 housed in which are a first valve element 212 and a second valve element 214 and fixed on which is the solenoid 208a, carried by a supporting bushing 209.

Moreover provided on the jacket 210 are the mouths 2, 6, whilst, as will emerge more clearly from the ensuing description, the mouth 4 is provided by means of the valve element 212.

The jacket 210 is traversed by a through hole sharing the axis H' and comprising a first stretch 216 having a diameter D216 and a second stretch 218 comprising a diameter D218, where the diameter D218 is greater than the diameter D216. In an area corresponding to the interface between the two holes a shoulder 219 is thus created.

The mouths 202, 206 are provided by means of through holes with radial orientation made, respectively, in a position corresponding to the stretch 216 and to the stretch 218 and in communication therewith.

Moreover provided on an outer surface of the jacket 10 are a first annular groove 220, a second annular groove 222, and a third annular groove 224, each designed to receive a gasket of the O-ring type, arranged on opposite sides with respect to the radial holes that define the mouth 202 and the radial holes that define the mouth 206.

In particular, the mouth 206 is comprised between the grooves 222 and 224 whilst the mouth 2 is comprised between the grooves 220 and 222.

Preferably, the three annular grooves 220, 222, 224 are provided with the same seal diameter so as to minimize the unbalancing induced by the resultant of the forces of pressure acting on the outer surface of the jacket 210, which otherwise would be such as to jeopardize fixing of the jacket of the solenoid valve in the corresponding seat provided on a component or in an oleodynamic circuit where it is installed.

The first valve element 212 is basically configured as a hollow tubular element comprising a stem 226—which is hollow and provided in which is a first cylindrical recess 227—, a neck 228, and a head 230, which has a conical contrast surface 232 and a collar 234. The neck 228 has a diameter smaller than the stem 226.

Moreover, preferably provided in the collar 234 is a ring of axial holes 234A, whilst a second cylindrical recess 235 having a diameter D235 is provided in the head 230.

The stem 226 of the valve element 212 is slidably mounted within the stretch 216, in such a way that the latter will function as guide element and as dynamic-sealing element for the valve element 212 itself: the dynamic seal is thus provided between the environment giving out into which is the first mouth 202 and the environment giving out into which is the second mouth 4. As has been described previously, this, however, gives rise to slight leakages of fluid through the gaps existing between the valve element 212 and the stretch 216, contributing to defining the hydraulic consumption of the solenoid valve 200.

The axial length of the stem 226 is chosen in such a way that it will extend along the stretch 216 as far as the holes that define the mouth 202, which are thus in a position corresponding to the neck 228 that provides substantially an annular fluid chamber.

The head 230 is positioned practically entirely within the stretch 218, except for a small surface portion 232 that projects inside the stretch 216 beyond the shoulder 219. In fact, the head 230 has a diameter greater than the diameter D216 but smaller than the diameter D218 so that provided in a position corresponding to the shoulder 19 is a first valve seat A1' for the valve element 212, in particular for the conical surface 232.

In a variant of the solenoid valve of FIG. 7, made in a position corresponding to the shoulder 219 is an annular chamfer that increases the area of contact with the conical surface 232 at the same time reducing the specific pressure developed at the contact therewith, hence minimizing the risks of damage to the surface 232. It is in any case important for the seal diameter between the valve element 212 and the shoulder 219 to be substantially equal to the diameter D216.

Provided at a first end of the jacket 210 is a first threaded recess 236 engaged in which is a bushing 238 comprising a plurality of holes that define the mouth 204. Some of said holes have a radial orientation, whilst one of them is set sharing the axis H'.

The bushing 238 houses a spacer ring 240, fixed with respect to the first valve element 212, bearing upon which is a first elastic-return element 242 housed within the recess 227. The choice of the band width of the spacer ring 240 enables adjustment of the pre-load of the elastic element 242. Fixed at the opposite end of the jacket 210 is a second bushing 244 having a neck 246 fitted on which is the supporting bushing 209. The bushing 244 constitutes a portion of the magnetic core of the electromagnet 8 and offers a contrast surface to a spacer ring 248 that enables adjustment of the stroke of the first valve element 212 and functions as contrast surface for the latter against the action of the elastic element 242. In effect, also the bushing 238 functions as contrast for the elastic element 242 in so far as the elastic forces resulting from the deformation of the elastic element are discharged thereon.

The second valve element 214 is set practically entirely within the bushing 244. In particular, the latter comprises a central through hole 250 that gives out into a cylindrical recess 252, facing the valve element 212. The valve element 214 comprises a stem 254 that bears upon a head 256, both of which are coaxial to one another and are set sharing the axis H', where the stem 254 is slidably mounted within the hole 250, whilst the head 256 is slidably mounted within the recess 252. It should be noted that in the embodiment described here the stem 254 simply bears upon the head 256 since—as will emerge more clearly—during operation it exerts an action of thrust (and not of pull) on the head 256, but in other embodiments a rigid connection between the stem 254 and the head 256 is envisaged. The stem 254 is, instead, rigidly connected to the anchor 264.

The head 256 further comprises a conical contrast surface 258 designed to co-operate with a second valve seat A2' defined by the internal edge of the recess 235.

Set between the head 256 and the bottom of the recess 252 is a spacer ring 260, the band width of which determines the stroke of the second valve element 214. In addition, the spacer ring 260 offers a contrast surface to the valve element 214, in particular to the head 256, in regard to the return action developed by a second elastic-return element 262, bearing at one end upon the head 256 and at another end upon the bushing 238. The elastic element 262 is set sharing the axis H' and inside the elastic element 242.

At the opposite end, the stem 254 is rigidly connected to an anchor 264 of the electromagnet 208 that bears upon a spring 266 used as positioning element. The maximum travel of the anchor 266 is designated by c'.

Preferably, the stroke of the anchor 266 is chosen so as to be equal to or greater than the maximum displacement allowed for the valve element 214.

Operation of the solenoid valve 200 is described in what follows. In the position illustrated in FIG. 7, corresponding to the position P1, the fluid that enters through the holes that define the mouth 202 traverses a first gap existing between the surface 232 and the seat A1' and a second gap existing between the seat A2' and the surface 258, flowing within the first valve element 212 and coming out from the bushing 238 through the mouth 204. In fact, in the position P1 the valve elements 212, 214 are kept detached from the respective valve seats and in contact, respectively, with the bushing 244 and the spacer ring 260, thanks to the action of the respective elastic elements 242, 262.

In traversing the first gap, part of the fluid can come out through the holes that define the third mouth 206, whereas another part of the fluid traverses the holes 234a and proceeds towards the second gap.

To switch the solenoid valve 200 from the position P1 to the position P2, it is sufficient to control the electromagnet 208 so that it impresses on the second valve element 214 a first movement that brings the latter, in particular the conical surface 258, to bear upon the second valve seat A2', disabling fluid communication between the first mouth 202 and the second mouth 204. In a way similar to the valve element 14, the valve element 214 is hydraulically balanced because the seal diameter, coinciding with the diameter D235 of the valve seat A2', is substantially equal to the guide diameter, i.e., the diameter of the recess 252.

This means that the force of actuation that must be developed by the electromagnet must overcome substantially just the action of the elastic element 242, remaining practically indifferent to the actions of the pressurized fluid inside the solenoid valve 200.

The aforesaid first movement is imparted to the valve element 214 by means of circulation, in the solenoid 208a, of a current having an intensity $I_1$ sufficient to displace the anchor 264 of just the distance necessary to bring the valve element to bear upon the seat A2' and to overcome the resistance of just the elastic element 262.

To switch the solenoid valve 200 into the position P3 from the position P2, it is necessary to increase the intensity of the current circulating in the solenoid 208a up to a value $I_2$, higher than the value $I_1$, such as to impart on the valve element 214 a second movement overcoming the resistance of both of the elastic elements 242, 262. Said second movement results in the movement (in this case with an action of thrust and not of pull as in the case of the solenoid valve 1) of the first valve element 212 in conjunction with the second valve element 214 up to the position in which the first valve element (thanks to the conical surface 232) comes to bear upon the seat A1', disabling the hydraulic connection between the mouths 2 and 4.

Also the valve element 214 is hydraulically balanced since the seal diameter, i.e., the diameter of the valve seat A2', is equal to the diameter of the recess 252 in which the head 256 is guided and slidably mounted.

During the second movement, the second valve element 214 remains in contact against the first valve element 212 keeping the hydraulic connection between the mouths 202 and 206 closed.

There moreover apply the considerations on the various alternatives for connection of the mouths 202, 204, and 206 to environments with different levels of pressure, and the considerations set forth for the solenoid valve 1 apply in the case where also the solenoid valve 200 is used in an ABS. Nevertheless, it is also possible to use dynamic-seal rings in the case where the solenoid valve 200 is used with gaseous fluids.

Figure 8:
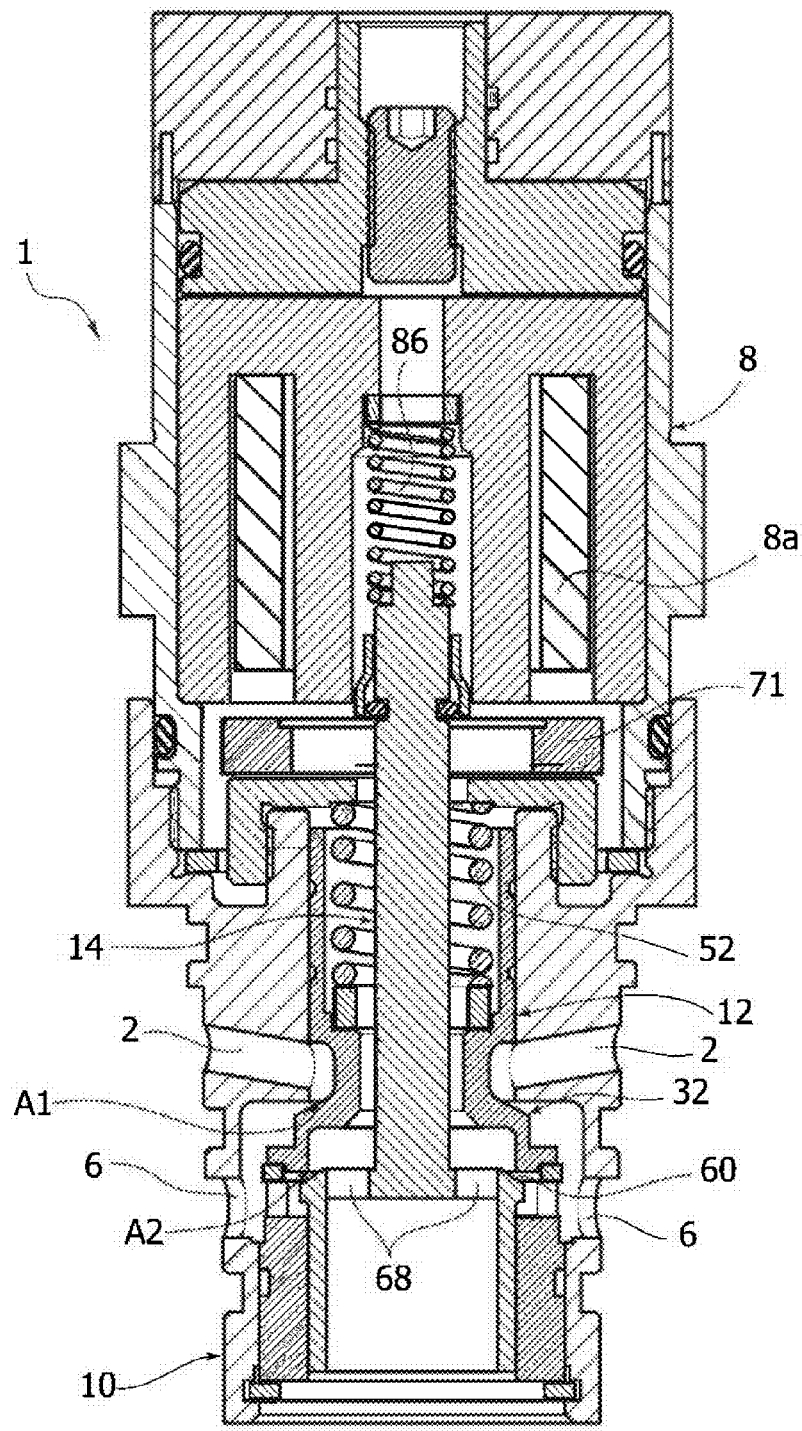
FIGS. 8, 9, 10 and 11 illustrate in cross section yet further variants of the solenoid valve of FIG. 1A.
Figure 9:
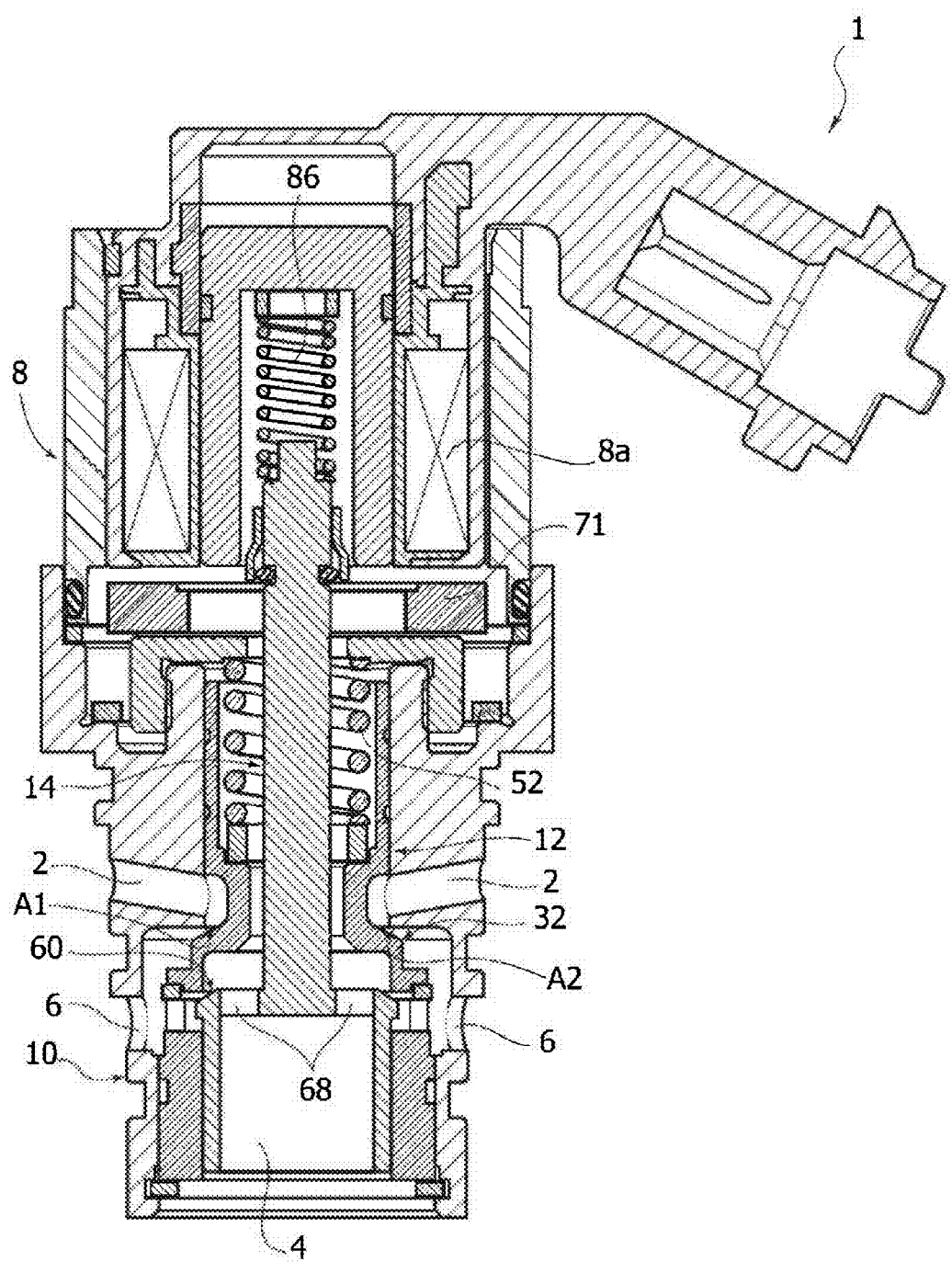

FIGS. 8 and 9 illustrate further embodiments of the solenoid valve, conceptually similar to that of FIG. 1A. In these figures, the parts corresponding to those of FIG. 1A are designated by the same reference numbers. As may be seen, the solenoid valves illustrated in FIGS. 8 and 9 differ in some constructional details from that of FIG. 1A, for example for the different arrangements of the openings 68 associated to the valve element 14.

Figure 10:
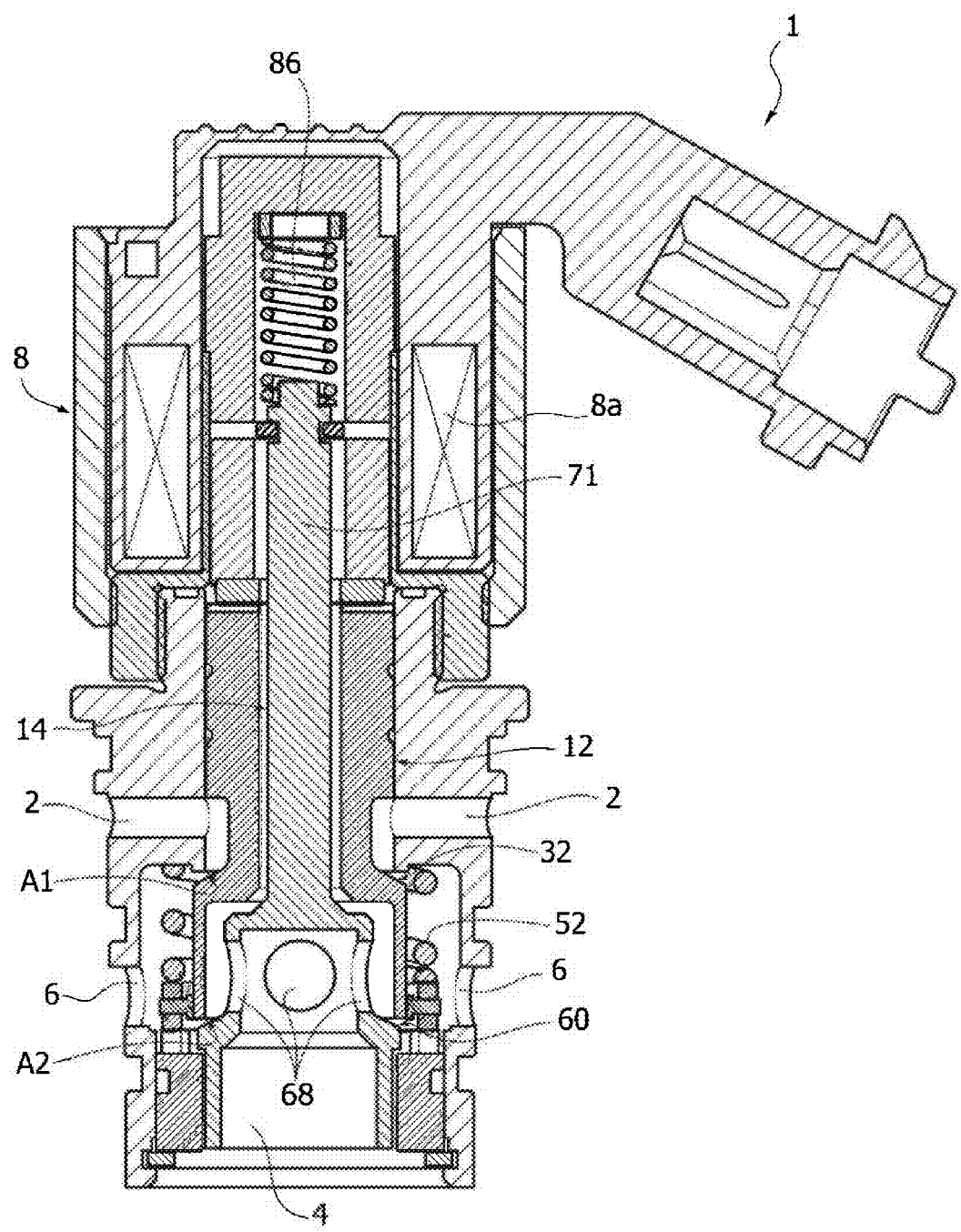

FIG. 10 illustrates a further embodiment, which likewise entails a different arrangement of the openings 68 made in the valve element 14 and a different arrangement of the electromagnet, which in this case envisages an anchor 71 constituted by the top part of the body of the valve element 14 that penetrates axially within the central opening of the solenoid 8a. A further difference of the valve of FIG. 10 lies in the fact that, in this case, the spring 52 that recalls the valve element 12 to the resting position is set on the outside of the above element instead of on its inside.

Figure 11:
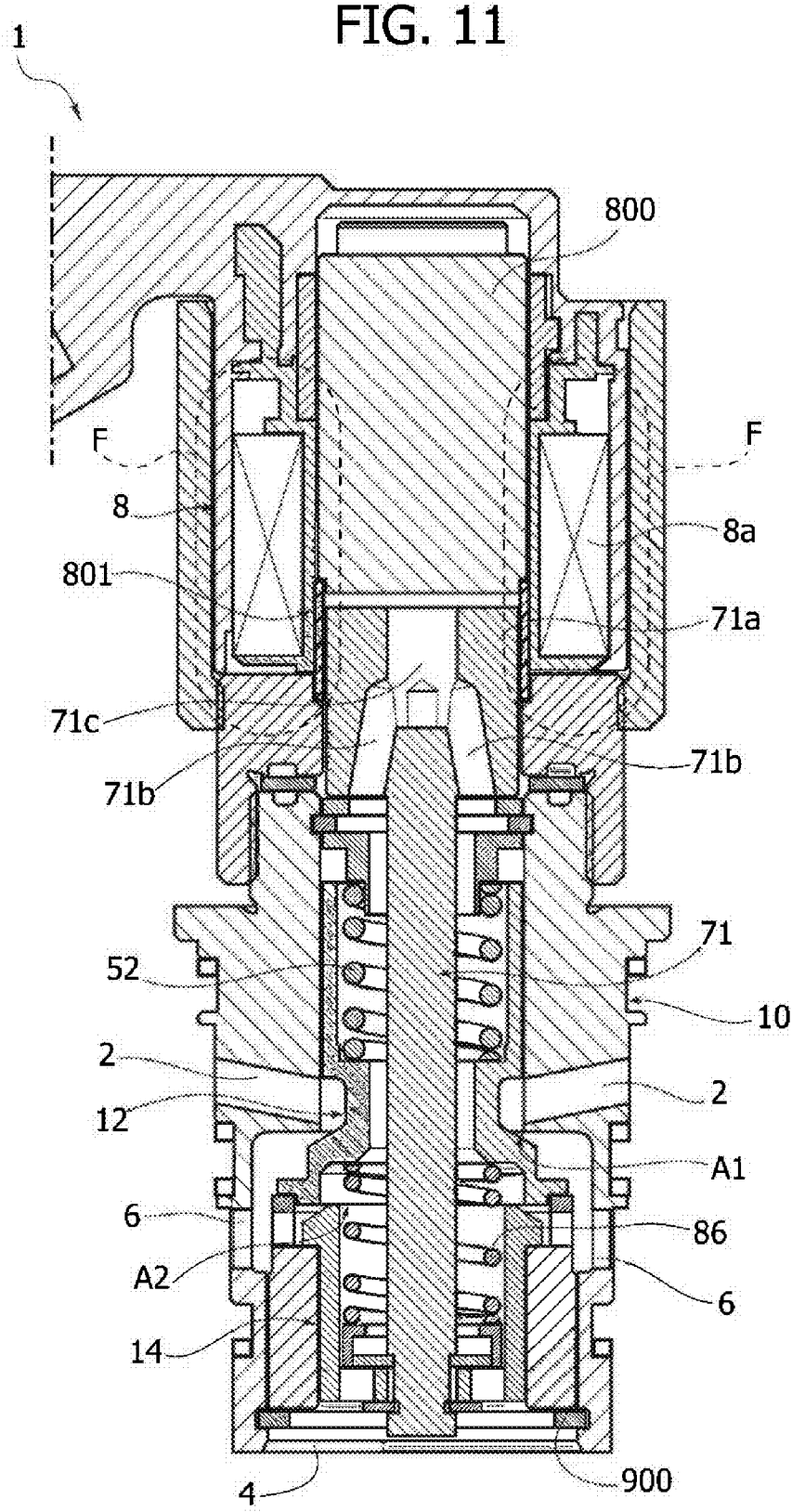

FIG. 11 shows a further variant, which is characterized by a series of additional arrangements (which, on the other hand, may be adopted also in the other embodiments illustrated above). In FIG. 1 the parts common to those illustrated in FIGS. 1A, 5A, 6 and 7 are designated by the same reference numbers.

A first important characteristic of the solenoid valve of FIG. 11 lies in the fact that both of the springs 86, 52 that recall the two valve elements 14 and 12 are set outside of the solenoid 8a. Consequently, within the solenoid 8a there may be provided a solid fixed body 800, which enables a greater magnetic flux to be obtained that attracts, towards the aforesaid body 800, a head 71a of an anchor, the stem 71 of which carries at the bottom end the valve body 14.

Moreover, the head 71a has channels 71b, 71c that enable communication of the pressure of the fluid that circulates in the valve on both sides of the head 71a so as to prevent any unbalancing.

A further preferred characteristic consists in providing a tubular insert 801 made of non-magnetic material (for example, AISI 400 steel) within which the head 71a is guided. In this way, the lines of magnetic flux are forced to follow the path designated by F, passing around the insert 801 and rendering the magnetic force that attracts the head 71a to the body 800 maximum.

Finally, in a way similar to the solutions of FIGS. 8,10, an elastic ring (circlip) 900 is provided, which withholds the set of the two valve elements within the body 10.

Figure 12:
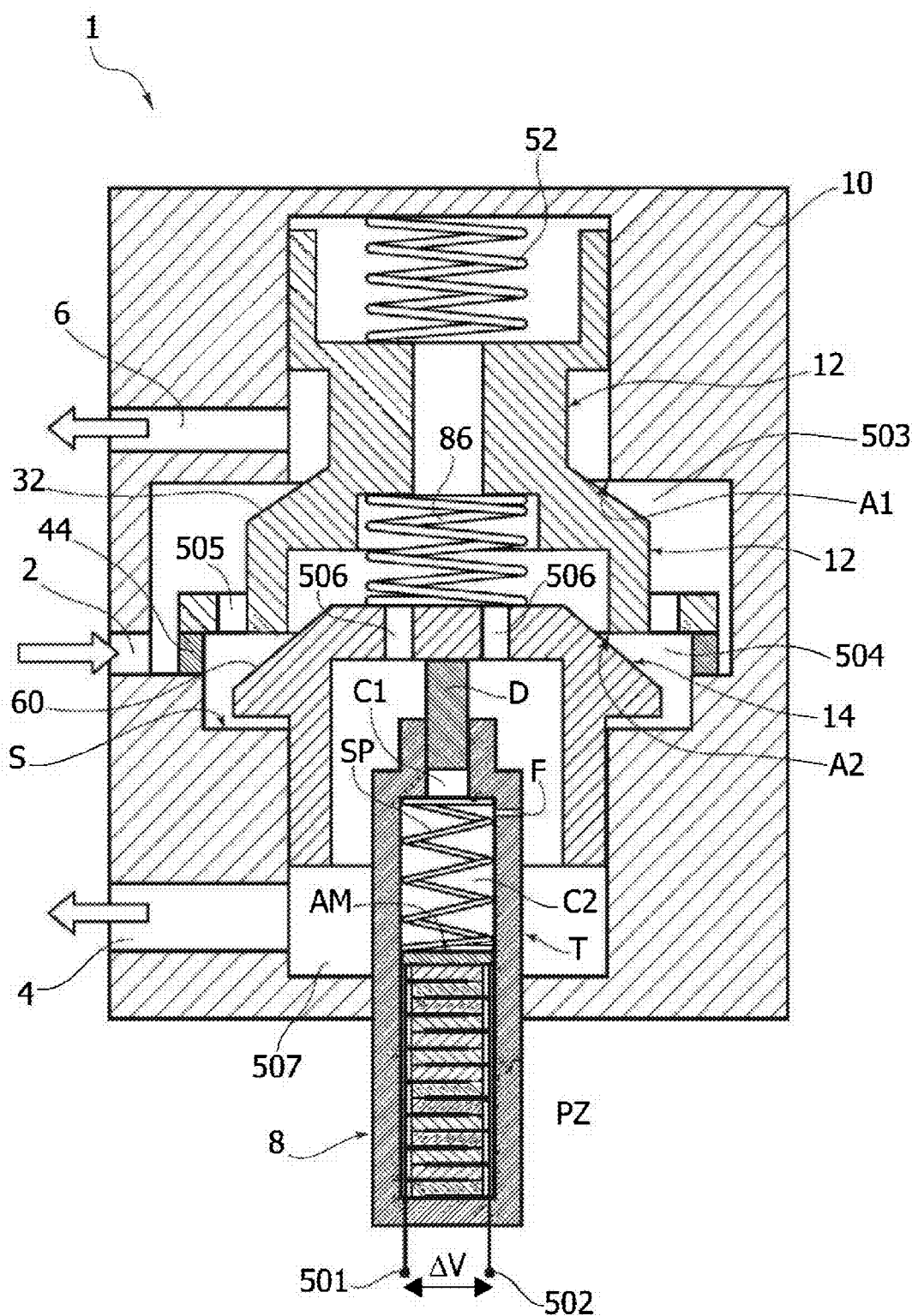
FIG. 12 shows a schematic cross-sectional view of a first embodiment of the valve according to the invention.

FIG. 12 illustrates a schematic cross-sectional view of a first embodiment of the control valve according to the present invention. The valve of FIG. 12 differs from the valves illustrated in FIGS. 1-11 in that it is provided with an electric actuator 8 that is not a solenoid actuator, but rather a piezoelectric actuator, comprising a stack of piezoelectric elements PZ set on top of one another. The opposite ends of each piezoelectric element PZ are connected to terminals 501, 502, in parallel to the opposite ends of the other piezoelectric elements. Across the terminals 501, 502 a voltage may be applied via electrical-supply means (not illustrated), which preferably are of a type that is such as to enable adjustment of the applied voltage.

Each of the piezoelectric elements PZ is typically constituted by a piezoelectric crystal. Piezoelectric crystals have been studied and used for some time. By applying a voltage to the opposite ends of a piezoelectric crystal there is obtained lengthening of the crystal that is proportional to the voltage applied. Normally, the linear lengthening of an individual crystal is in the region of a few microns. Consequently, by providing a stack of piezoelectric crystals set on top of one another and applying a voltage at the ends of each piezoelectric element, it is possible to obtain an overall displacement for example in the region of hundredths or tenths of a millimeter.

A piezoelectric actuator is able to generate considerable forces, of the order of hundreds of newtons. Another advantage of piezoelectric actuators is that they are characterized by an extremely fast response; finally, the property of piezoelectric elements of undergoing lengthening in a way proportional to the voltage applied enables the valve elements 60 and 32 to occupy intermediate positions with respect to the case of the solenoid actuator.

In the case of the embodiment illustrated schematically in FIG. 12, the actuator member, designated as a whole by AM, is constituted by the stack of piezoelectric elements PZ. Said actuator member AM is connected to the second valve element 14 with interposition of a transmission that generates a length of movement of the second valve element 14 greater than the length of movement corresponding to lengthening of the actuator member AM. This transmission could be, for example, a mechanical transmission, in particular a lever transmission, designed to enable multiplication of the displacement generated by the actuator member AM. Preferably, however, as illustrated schematically in FIG. 12, the transmission is a hydraulic transmission, comprising a hydraulic cylinder T with a fluid chamber having a section of smaller diameter C1 and a section of larger diameter C2. In the wall of the cylinder T at least one hole F is provided connected to a pressurized-fluid environment (as will emerge clearly in what follows) in such a way as to guarantee automatic restoration within the chamber C1, C2 of pressurized fluid following upon possible losses due to leakage. The fluid in the cylinder T is the same fluid that traverses the valve 1.

Thanks to the arrangement described above, lengthening of the actuator member AM constituted by the stack of piezoelectric elements PZ determines a displacement of the fluid from the chamber C2 to the chamber C1, with consequent multiplied linear displacement of a driven member D that is slidable within the section of smaller diameter of the cylinder T and that is operatively connected to the second valve element 14.

In the embodiment illustrated schematically in FIG. 12, in the cylinder T elastic means are provided constituted, in the specific example illustrated, by a helical spring SP, which induce a state of precompressive stress in the stack of piezoelectric elements PZ in order to improve operation thereof, according to a technique in itself known. Use of said precompressive elastic means is of course possible also in the case where a transmission T for multiplication of the displacement is not adopted.

For the rest, the structure of the control valve 1 is substantially similar to the one already described above with reference to FIGS. 1-11. Consequently, in FIG. 12 the parts common to those of FIGS. 1-11 are designated by the same reference numbers.

The valve 1 comprises a body 10 slidably guided within which are the first valve element 12 and the second valve element 14. The first valve element 12 has a conical surface 32 co-operating with a valve seat A1. It is pushed by a spring 52 into an opening position, in which the bottom end (with reference to the figure) of the valve element 12 bears upon a ring 44 rigidly connected to the body 10 of the valve. In this opening position, the conical surface 32 is spaced apart from the valve seat A1.

The second valve element 14 has an end head with conical surface 60 co-operating with a valve seat A2 and pushed by a spring 86 (which in this case is set between the two valve elements 12, 14) into an opening position, in which the head of the second valve element 14 bears upon a surface S of the body of the valve. In this opening position, the conical surface 60 of the second valve element 14 is spaced apart from the valve seat A2. In FIG. 12, the second valve element 14 is illustrated in an intermediate position between its opening position and its closing position.

In a similar way to the embodiments of FIGS. 1-11, the control valve 1 comprises an inlet mouth 2 and two outlet mouths 4, 6. In the resting condition, when both of the valve elements 12, 14 are pushed by the respective springs 52, 86 into their opening positions, in contact respectively with the ring 44 and with the surface S, the pressurized fluid at inlet through the mouth 2 can flow both as far as the outlet mouth 4 and as far as the outlet mouth 6. In order to reach the mouth 4, the fluid entering through the mouth 2 flows within a chamber 503 and from this into a chamber 504 through holes 505 made in the body of the first valve element 12. From the chamber 504 the fluid passes through the passage left open between the valve seat A2 and the conical surface 60 of the second valve element 14. The fluid then flows through holes 506 made in the body of the second valve element 14 as far as a chamber 507 provided within the body of the second valve element 14 and within the body 10. The chamber 507 communicates with the outlet mouth 4. In a similar way, the pressurized fluid entering through the mouth 2 is able to flow as far as the outlet mouth 6 passing through the chamber 503 and through the passage defined between the valve seat A1 and the conical surface 32 of the first valve element 12.

The condition described above corresponds to the position P1 of the control valve 1.

When the control valve 1 is in its second operative position P2, i.e., when the actuator member AM has caused closing of the second valve element 14 against the valve seat A2, with the first valve element 12 still in the opening position, communication between the inlet mouth 2 and the outlet mouth 4 is interrupted, whereas communication of the inlet mouth 2 with the outlet mouth 6 continues to exist.

In the position P3 of the control valve 1, both of the valve elements 12, 14 are in their closing position, in contact with the respective valve seats A1, A2 so that the communication of both of the outlet mouths 4, 6 with the inlet mouth 2 is interrupted.

The main advantage of a piezoelectric actuator of the type illustrated schematically in FIG. 12 as compared to a solenoid actuator lies in the possibility of varying as desired the law of motion of the valve elements 12, 14, by regulating the supply voltage of the piezoelectric actuator. In the case of the solenoid actuator, the movements of the valve between the positions P1, P2, P3 are substantially instantaneous. In the case of the piezoelectric actuator of FIG. 12, instead, the speed of displacement of the second valve element 14 during passage from the position P1 to the position P2, and the speed of displacement of the set of the two valve elements 12, 14 during passage from the position P2 to the position P3, as well as finally the speed of the displacement of return of the two valve elements 12, 14 into the resting position corresponding once again to the position P1, depend upon the supply voltage of the piezoelectric actuator; moreover, since the piezoelectric actuator is of a linear type, the valve 1 can work, no longer in just three operating positions, but in infinite operating positions, since intermediate operating positions are now allowed between P1 and P2 or between P2 and P3, it being necessary to respect just the constraint whereby the intermediate positions between P2 and P3 can be obtained only after the second valve element 14 has come to bear upon the first element 12. In practice, it is possible to have infinite working positions of the valve 1 between the position P1 and the position P2, progressively reducing the section of passage A2 whereas the section of passage A1 remains completely open; thus, it is possible to have infinite intermediate positions between the position P2 and the position P3 of the valve 1, maintaining the section A2 closed and reducing the section of passage A1.

Thanks to the above characteristic, the valve of FIG. 12 is suited to being used advantageously in a wide range of applications.

A particularly advantageous application consists in the use of the valve of FIG. 12 as control valve for driving a fuel-injection valve in an internal-combustion engine. This application is illustrated schematically in FIG. 13, with reference, by way of example, to an injection system designed for a direct-injection diesel engine.

Figure 13:
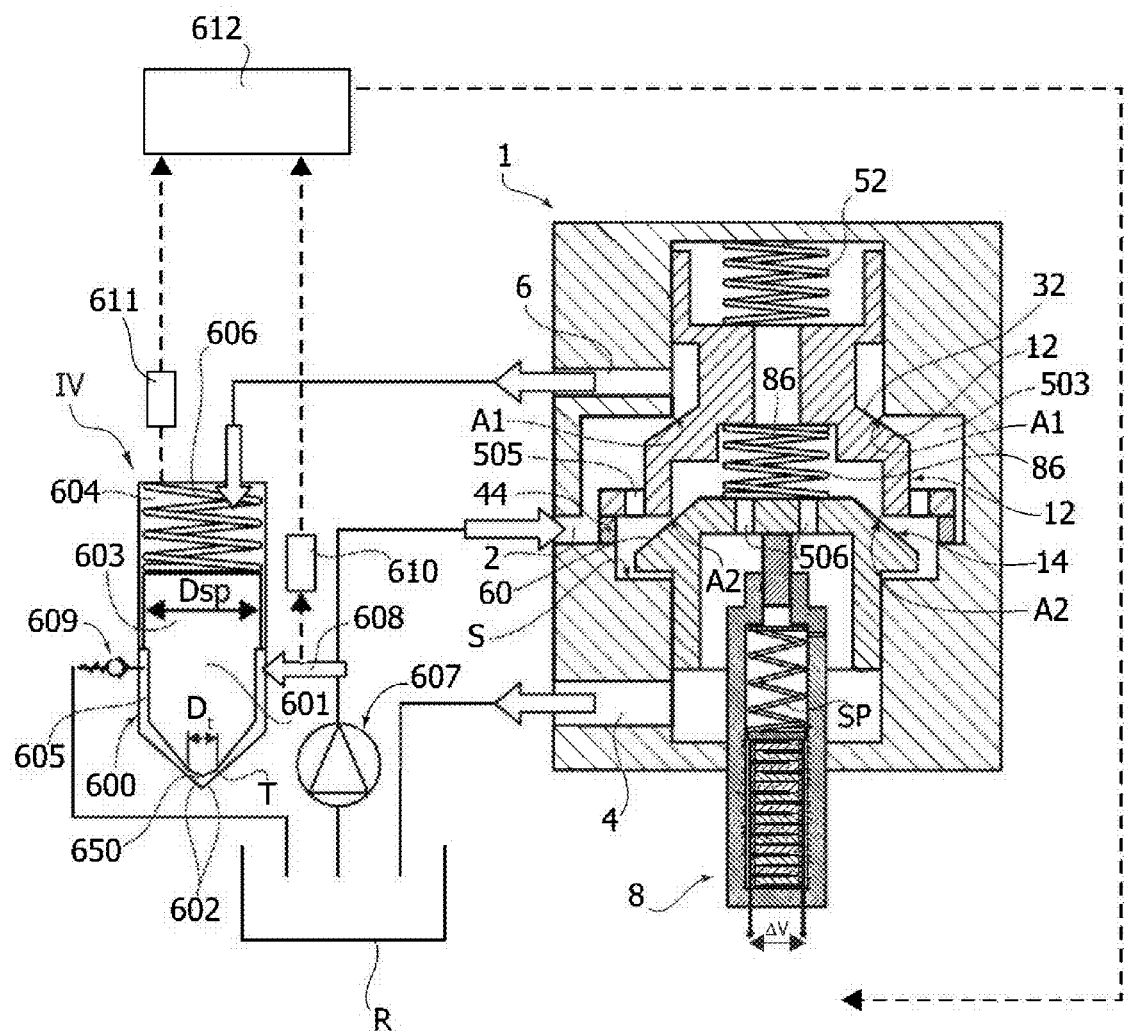
FIG. 13 is a diagram that shows application of the valve of the invention to a fuel-injection system for an internal-combustion engine.

With reference to FIG. 13, designated by IV is an injection valve comprising a body 600 mobile within which is a pulverizer plug 601, the tip of which co-operates with pulverization holes 602 formed in the body 600. The plug 601 is connected to a plunger 603 slidable in the body 600 of the valve IV between a head chamber 604 and an injection chamber 605. A spring 606 is set in the head chamber 604 between the plunger 603 and the top end of the internal cavity of the body 600 for pushing the plunger 603 and the plug 601 into the position of obstruction of the pulverization holes 602.

Obstruction of the holes 602 takes place when the edge T on the tip of the plug 601, defined for example between two conical portions with different angle of conicity, bears upon the bottom surface of the body 600 providing a seal covering the diameter Dt (the holes 602 are hence not occluded directly by the plug 601); it should be noted that the seal diameter Dt is much smaller than the diameter Dsp of the plunger 603.

The arrangement of the valve IV described above is such that the mobile element comprising the plunger 603 and the plug of the pulverizer 601 is hydraulically semi-balanced, in the sense that it remains in its closing position, which obstructs the sump 650 for delivery to the pulverization holes 602 as long as the first chamber 606 and the second chamber 605 are at the same pressure. The term "semi-balanced", referred to the mobile element, is due to the fact that, in the closing position, i.e., when there is sealing of the edge T at the bottom surface of the body 600, acting on the surface defined by the diameter Dt of the mobile element is the pressure of the combustion chamber into which the valve IV gives out, which is much lower than the pressure of the injection chamber 605 and the pressure of the head chamber 604: this generates a force $F_{Hy}$ that contributes to maintaining the mobile element in the closing position, and hence the risk is prevented of even microscopic amounts of fuel flowing from the injection chamber 605 into the sump 650 at undesired instants (in practice, outside the time interval during which injection takes place).

In addition to being hydraulically semi-balanced, in the way just described, the mobile element is recalled into the position of obstruction of the sump 650 also by a spring 606 that exerts a force $F_M$.

The mobile element 603 shifts into a position of opening of the pulverization holes 602 only when the pressure in the injection chamber 605 exceeds the pressure in the head chamber 606 by a pre-determined value $\Delta p$ depending upon the forces $F_{Hy}$ and $F_M$. From a practical standpoint, in the design step, once $D_{sp}$, $D_t$ and the pre-load of the spring $F_M$ chosen have been defined, the desired $\Delta p$ is determined, and the valve 1 is configured accordingly: in particular, $\Delta p$ will depend upon the section of passage A1 defined within the valve 1 and hence upon the position of the first valve element 12.

In the application illustrated in FIG. 13, the injection valve IV is driven by a control valve 1 of the type described with reference to FIG. 12. The inlet mouth 2 of the valve 1 is connected to the delivery of a pump 607, which takes in the fuel from a tank R generally at atmospheric pressure. The delivery of the pump 607 is also connected via a line 608 to the injection chamber 605 of the valve IV. The outlet mouth 4 is connected to the discharge tank R, whilst the outlet mouth 6 is connected to the head chamber 604. Associated to the injection chamber 605 is a pressure-limiting valve 609, which sets the chamber 605 in discharge once a pre-determined maximum value of pressure is exceeded.

The system illustrated by way of example in FIG. 13 regards the case in which a closed-loop control of the motion of the plug of the pulverizer is provided. In this case, pressure sensors 610, 611 are thus provided associated to the line 608 (or to the injection chamber 605) and to the head chamber 604, these signals being sent to an electronic control unit 612, which controls the value of the supply voltage of the piezoelectric actuator 8 accordingly.

Figure 14A:
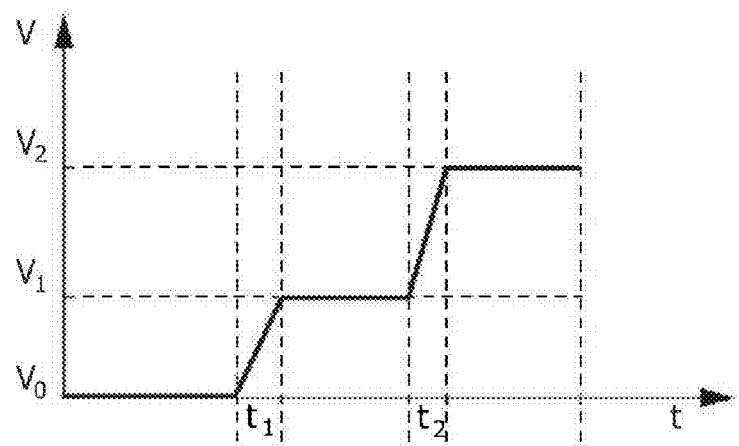
FIGS. 14A, 14B, 14C, 15-18 are diagrams that show the principles and advantages of the invention.
Figure 14B:
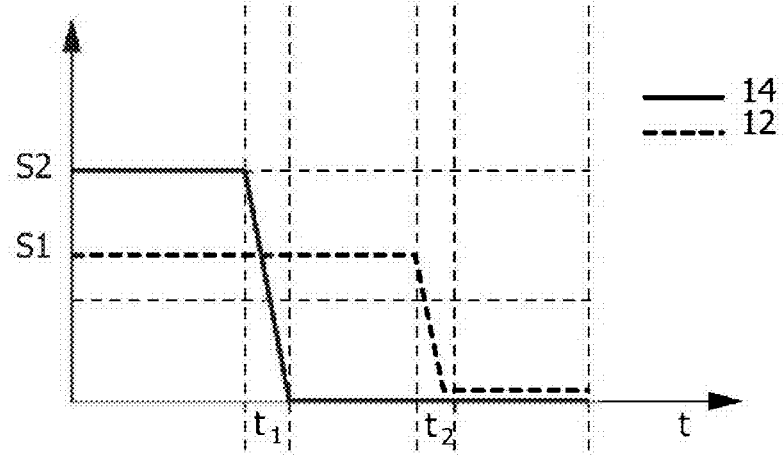
Figure 14C:
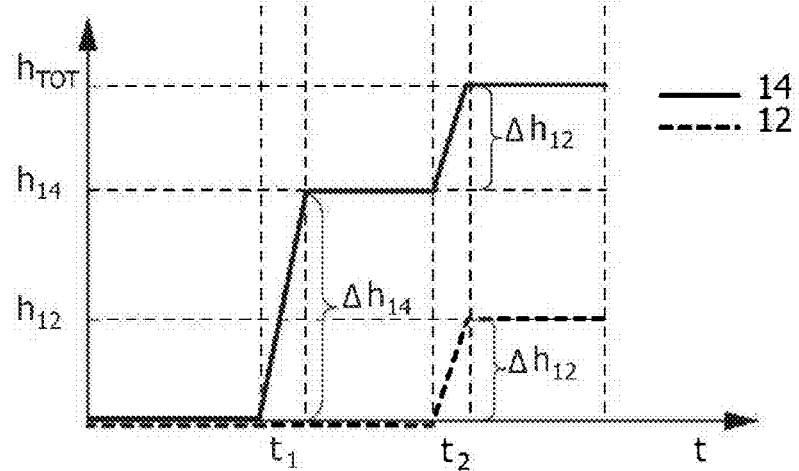

FIGS. 14A, 14B, 14C correspond to FIGS. 4A, 4B, 4C already discussed above for the case where the electric actuator of the valve 1 is a piezoelectric actuator instead of a solenoid actuator. FIG. 14A shows the variation in time of the supply voltage of the piezoelectric actuator, which enables shifting of the valve from the position P1 to the position P2 and from the position P2 to the position P3. The diagrams of FIGS. 14B and 14C show the corresponding variations of the area of passage S1, S2 in a region corresponding to the valve seats A1, A2, as the valve elements 12, 14 move into the closing position. FIG. 14C shows the corresponding axial displacements of the valve elements.

As is evident from a comparison of FIGS. 14A, 14B, 14C with FIGS. 4A, 4B, 4C, the piezoelectric actuator provides a non-instantaneous displacement of each valve element 12, 14 from its opening position to its closing position. The speed with which this displacement takes place depends both upon the law with which the supply voltage of the piezoelectric actuator is applied and upon the intensity thereof. Consequently, as already indicated above, a variation of the supply voltage enables adjustment as desired of the law of motion of the valve elements 12, 14. It should be recalled that, for what has been said previously, also intermediate positions of the valve elements are possible between those that correspond to the maximum openings S1 and S2 and appearing in FIGS. 14A, 14B, 14C.

With reference now again to FIG. 13, as well as to FIG. 15, operation of the control system of FIG. 13 will be described.

As already indicated, the plug 601 of the pulverizer can rise into its opening position only when the pressure in the injection chamber 605 reaches a value Pth that exceeds the value of pressure P0 in the head chamber 604 by a pre-determined ΔP.

Figure 15:
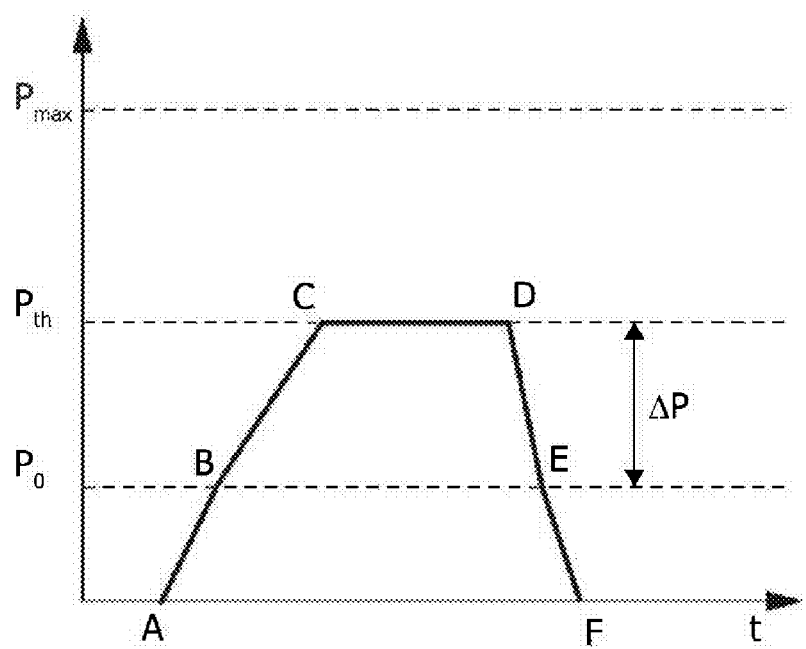

With reference to the diagram of FIG. 15, prior to the instant in time A the supply voltage of the piezoelectric actuator 8 is zero ($V_0$ in FIG. 15). In this condition, the springs 52, 86 maintain the two valve elements 12, 14 in their opening positions. As has already been illustrated above, in this condition the inlet mouth 2 of the control valve 1 communicates with both of the outlet mouths 4, 6. Consequently, in this condition, corresponding to the position P1 of the control valve 1, the pressurized fuel coming from the pump 607 reaches the inlet mouth 2 of the valve 1 and from here passes to the discharge R through the outlet mouth 4. In this condition, the pressure in the chambers 604, 605 of the injection valve IV does not increase, notwithstanding the fact that both of the above chambers are in communication with the delivery of the pump 607.

With reference to FIG. 15, at the instant A a voltage V=V(t) is applied ($V_0$-$V_1$ in FIG. 14A) across the piezoelectric actuator 8. The actuator member AM constituted by the stack of piezoelectric elements PZ hence starts to lengthen at a rate that is a function of the value of voltage applied in time. Lengthening of the piezoelectric actuator is transmitted to the driven member D by the fluid present in the cylinder T so that the second valve element 14 starts to move away from its opening position and to approach the valve seat A2, against the action of the spring 86.

The instant B in FIG. 15 is the one at which the second valve element 14 comes to bear upon the valve seat A2. In this way, the control valve 1 is brought into the position P1 in which communication between the inlet mouth 2 and the outlet mouth 4 is interrupted, so that the delivery of the pump 607 is no longer connected to the discharge R.

Consequently, in the time that elapses from the instant A to the instant B the valve has moved from its position P1 to its position P2. The length of said time interval is a function of the law of application of the supply voltage of the piezoelectric actuator, as well as of the geometries of the sections of passage of the valve 1 and of the capacity of the pump 607. As has already been mentioned above, this constitutes an important difference with respect to the case of a solenoid actuator, for which switching from the position P1 to the position P2 is substantially instantaneous. Consequently, with the control valve of FIG. 12 it is possible to adjust the supply voltage of the piezoelectric actuator 8 in order to obtain a desired law of motion of the second valve element 14 during passage of the valve from the position P1 to the position P2.

When the valve is in the position P2, the supply pump 607, no longer connected to the discharge R, is able to cause the pressure to rise both in the injection chamber 605, which is directly connected to the delivery of the pump 607 via the line 608, and in the head chamber 606, which receives the pressurized fluid through the outlet mouth 6 of the control valve 1. In this position P2 of the valve, consequently, the plug 601 of the pulverizer continues to remain in its closed position, in so far as, as has already been said, the plug 601 cannot be opened as long as the pressure in the chambers 604, 605 has substantially the same value.

Passage from the position P2 to the position P3 takes place by applying across the piezoelectric actuator 8 a higher value $V_2$ of voltage (see FIG. 14A) in such a way as to push the first valve element 12, via the second valve element 14, into its position of closing on the valve seat A1, against the action of the spring 52. As mentioned above, also this passage takes place at a rate that depends upon the law of application of the voltage. Consequently, the position P3 of the valve is reached at an instant C (FIG. 15) subsequent to the instant B. At the instant C, the value of the pressure in the injection chamber 605 has reached the pre-determined value Pth and hence the plug 601 has the possibility of starting to open.

The rate at which the plug 601 of the pulverizer opens, and consequently the instantaneous flow injected in the very first instants, depends upon the speed of the movement of closing of the first valve element 12 (as well as upon the capacity of the pump 607 and upon the sections of passage A1 and upon the geometry of the hydraulic connections). Once in the design step the ΔP of intervention has been pre-determined, the instant in which the valve element 12 closes defines the level of pressure Pth, which corresponds to the value of the injection pressure. Consequently, via the control valve according to the invention, it is possible to obtain an adjustment of the injection pressure as a function of the engine operating points.

What has been mentioned above applies in a similar way also for the end of the injection event, i.e., for the passage from the instant D to the instant E in FIG. 15 (passage of the valve from the position P3 to the position P2) and the subsequent passage from the instant E to the instant F, corresponding to passage of the valve from the position P2 to the position P1.

In the position P1 the pump 607 performs the minimum work, because its delivery is set directly in discharge.

As is evident from the foregoing description, the valve of FIG. 12 consequently enables correlation of the law of motion of the plug 601 of the pulverizer to the laws of motion of the valve elements 12, 14, which can be controlled by means of the supply voltage of the piezoelectric actuator.

Of course, the injection system of FIG. 13 can be used also without a closed-loop control. Moreover, the system can be adopted in any type of engine, for example a diesel engine, or a petrol engine, or a gas-supplied engine. As has been said, the main advantage of the system consists in the possibility of assigning any desired law of motion to the plug 601 of the pulverizer.

In the specific case of a diesel engine, control of the law of motion of the plug 601 of the pulverizer enables control of the instantaneous flowrate of fuel through the pulverizer (injection rate). The law of injection (injection rate) affects the combustion and consequently the products of combustion (in particular, HC and NOx).

Figure 16:
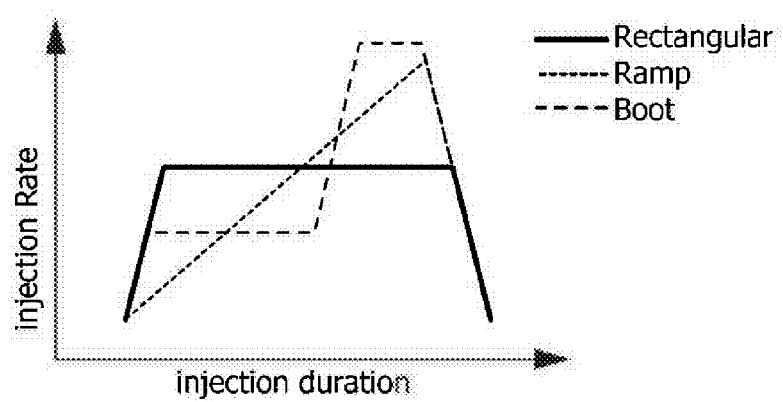
Figure 17:
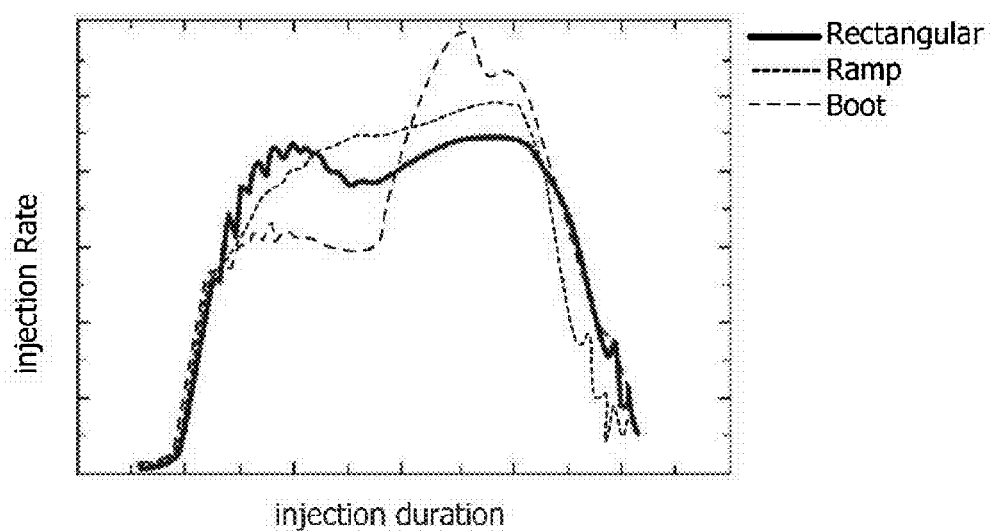
Figure 18:
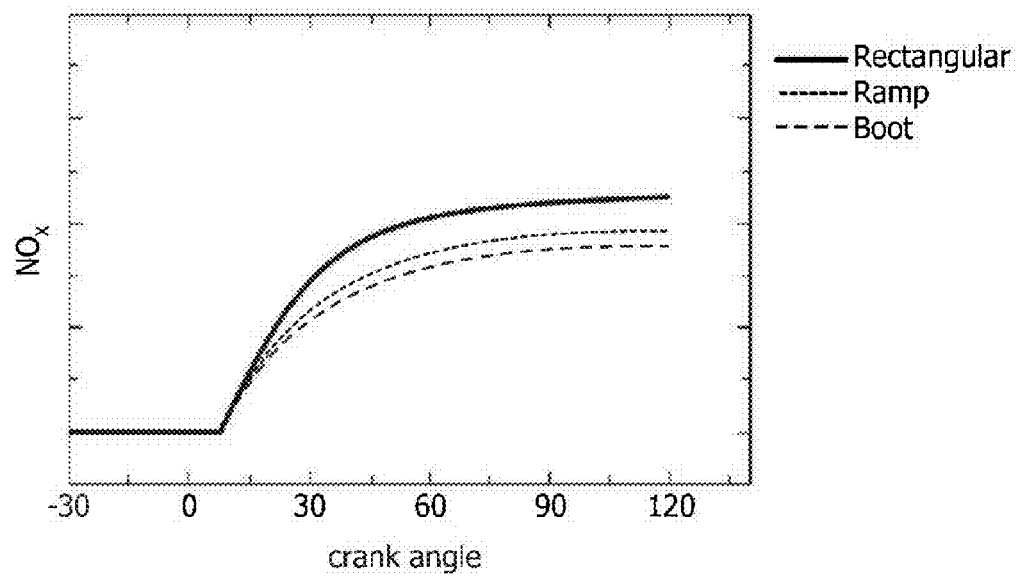

FIG. 16 shows a schematic diagram of the injection rate as a function of time, according to three different particular modes: "rectangular", "ramp", "boot". According to the engine operating point, each of the three laws presents optimal characteristics with respect to the others. In particular, injection of a "boot" type enables reduction of the NOx emissions as compared to the others. FIG. 17 is a real diagram that shows the three different injection modes, corresponding to the theoretical diagram of FIG. 16. FIG. 18 shows the advantage in terms of reduction of NOx that is obtained with the "boot" mode.

The majority of diesel-injection systems known and currently available on the market, in which a two-way and two-position control valve is used, does not enable actuation of the plug of the pulverizer with a law for example of the "boot" type or of the "ramp" type.

Instead, the three-way and three-position valve according to the invention, with piezoelectric actuator, enables actuation of the plug of the pulverizer with multiple laws of motion. In practice, the possibility of controlling the valve elements 12, 14 with any law of motion enables control of the law of motion of the plug of the pulverizer and hence the injection rate of the injection valve.

In the system illustrated above, the aforesaid source of pressurized fluid may comprise, according to a technique in itself known, a high-pressure pump comprising pumping elements operated by a rotary cam or by a rotary eccentric member. Moreover, downstream of the high-pressure pump there may be provided a rail, in turn connected to the control valve 1 and to the first fluid chamber 605 of the injection valve.

Figure 19:
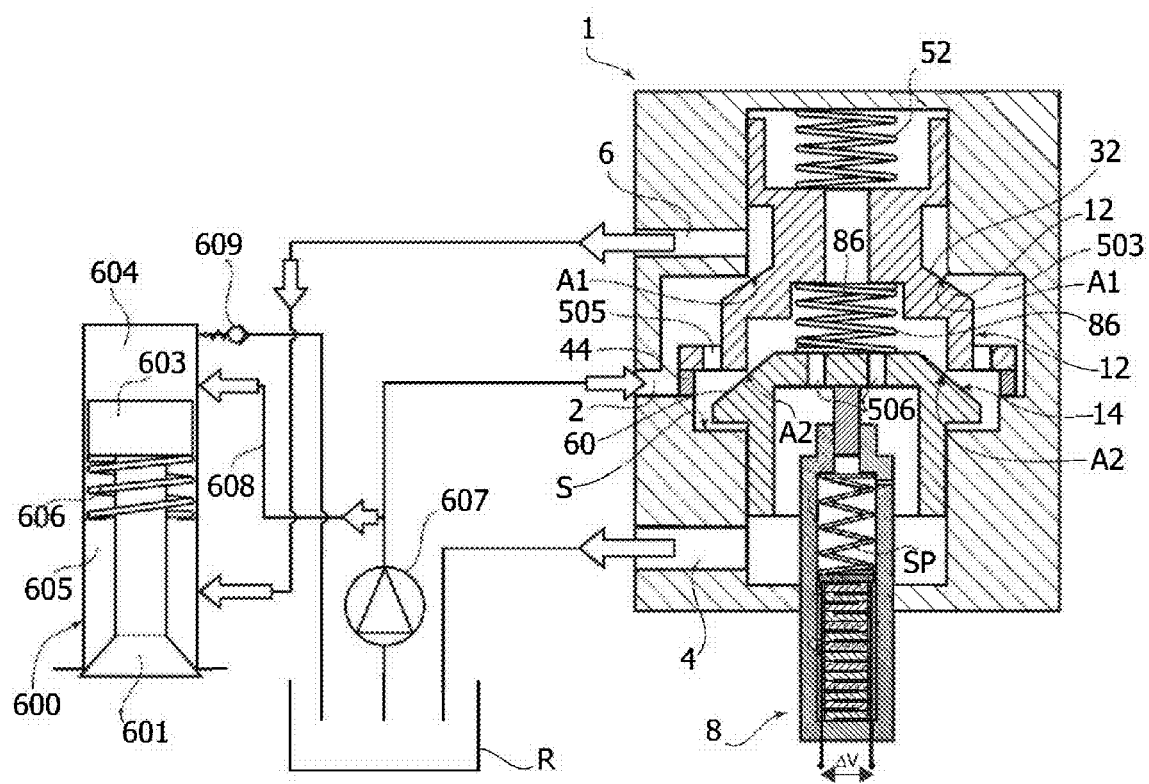
FIGS. 19, 20 are variants of FIGS. 13, 12.

FIG. 19 shows a variant of FIG. 13 that differs in that opening of the valve is obtained with lowering of the plug 601 with respect to the body 600. In this case, the spring 606 tends to recall the plug 601 upwards (as viewed in the drawing), into a position of closing of the valve. The plug 601 remains in its closing position as long as the pressure in the chambers 604, 605 remains the same. The plug drops, thus opening the valve, when the pressure in the head chamber 604 exceeds the pressure in the injection chamber 605 by a pre-determined ΔP. In this case, the injection chamber 605 is connected to the outlet mouth 6 of the control valve 1, whereas the head chamber 604 is connected, via the line 608, to the delivery of the supply pump 607. The outlet mouth 4 is always connected to the discharge tank R. The pressure-limiting valve 609 is associated to the head chamber 604 and connects this chamber to the discharge tank R above a pre-set maximum pressure. In this case, when the control valve 1 is brought into the position P3, communication of the injection chamber 605 with the outlet mouth 6 is interrupted so that the pressure in the head chamber 604 increases with respect to the value of pressure in the injection chamber 605 up to a pre-determined value at which the plug 601 opens.

Figure 20:
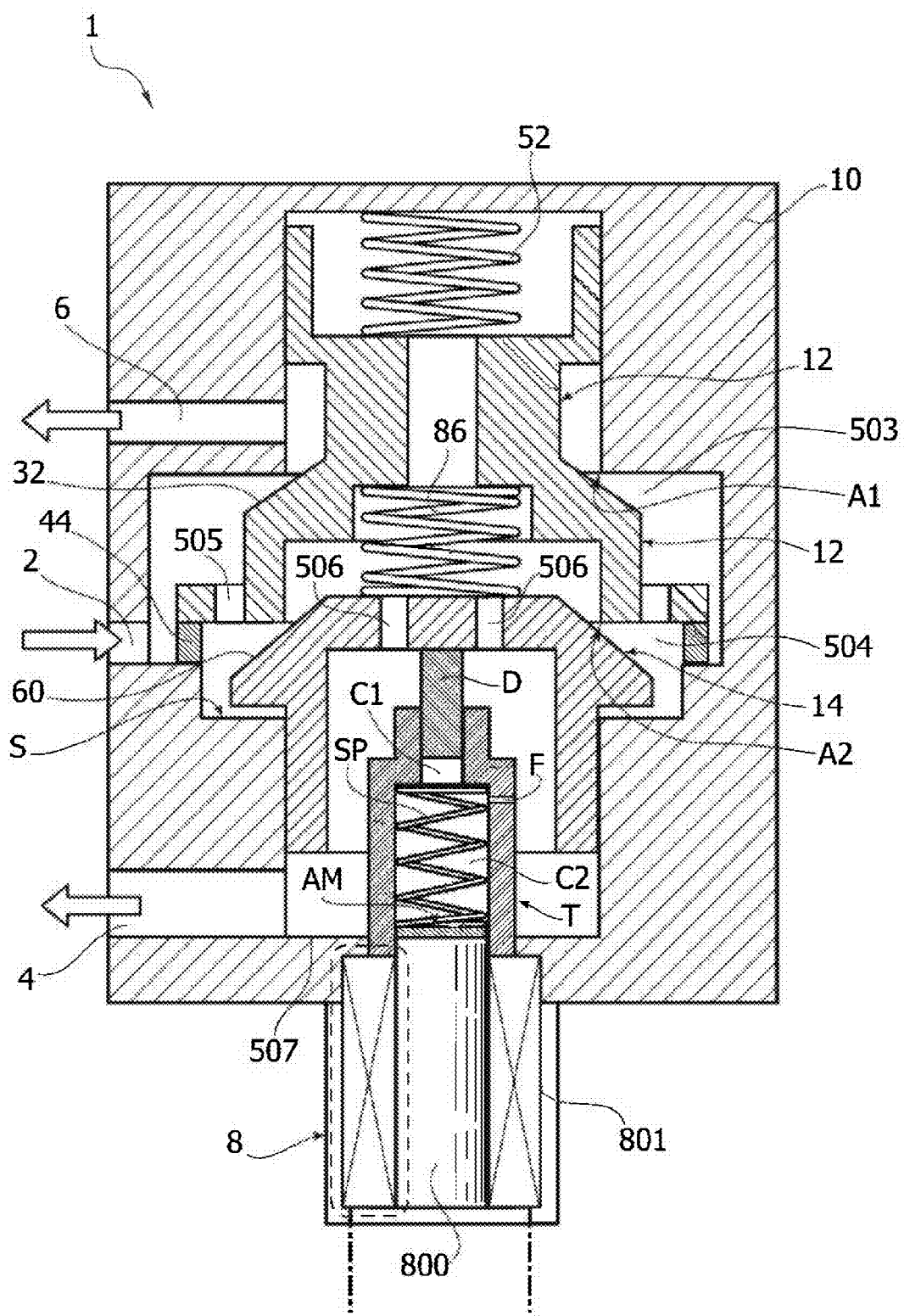

FIG. 20 illustrates a second embodiment of the valve according to the invention in which the actuator 8 is constituted by an actuator of a magnetostrictive type, instead of by a piezoelectric actuator. In this case, the actuator 8 consequently comprises a bar 800 made of magnetostrictive material, set inside a solenoid 801. Supply of the solenoid 801 induces a magnetic flux through the bar 800 that causes lengthening thereof (the path of the lines of magnetic flux is represented schematically with a dashed line).

The magnetostrictive materials have been known and used for some time. They present the characteristic of undergoing pre-determined lengthening when they are subjected to a magnetic field generated by a solenoid. By varying the supply current of the solenoid 801 it is possible to vary the rate of lengthening of the bar 800 of magnetostrictive material. In the case of the example illustrated in FIG. 20 the fluid cylinder T is likewise provided for multiplying the displacement of the actuator, shaped and functioning in a way identical to what has been described with reference to FIG. 12. For the rest, the constructional details of the valve 1 may be identical. Also in this case, elastic means SP are provided designed to induce a precompressive state of stress in the bar 800 of magnetostrictive material.

Also the actuator of a magnetostrictive type presents the advantages that have been described above with reference to the piezoelectric actuator. Consequently, also in this case, it is possible to vary the law of motion of the valve elements 12, 14 as desired, by appropriately regulating the electric current (instead of the voltage) for supply of the solenoid 801. Consequently, all the advantages set forth above with reference to the embodiment of FIG. 12 apply also in the case of the embodiment of FIG. 20. In addition, also the embodiment of FIG. 20 is suited to being used in an injection system of the type illustrated in FIG. 13 or in FIG. 19.

Once again in a way similar to what has been indicated above, the transmission designed to multiply the displacement determined by the actuator member 800 may be of any type and in particular may be also a mechanical transmission, for example with levers, instead of a fluid transmission.

Moreover, as in the embodiment of FIG. 12, also in this case a spring SP is provided that recalls the actuator member 800 into the condition of minimum length.

Moreover, both for the embodiment of FIG. 12 and for the embodiment of FIG. 20 there is in any case envisaged the possibility of using an actuator of a piezoelectric type or of a magnetostrictive type, without using a transmission for multiplication of the displacement.

As has already been mentioned above, all the constructional details regarding the body of the valve 1, the valve elements 12, 14, the springs 52, 86, the arrangement of the sealing elements and any further constructional details may be provided in a way identical or similar to what has been illustrated in FIGS. 1-11 for the valves with solenoid actuator.

Moreover, in the annexed drawings the constructional details of the piezoelectric actuator and of the magnetostrictive actuator are not illustrated both in so far as they can be provided in any known way and in order to render the drawings simpler and more readily understandable, as well as also in so far as the above actuators, taken in themselves, do not fall within the scope of the present invention.

Of course, without prejudice the principle of the invention, the details of construction and the embodiments may vary widely with respect to what has been described and illustrated by way of example, without thereby departing from the scope of the present invention.

What is claimed is:

1. An electrically or electromagnetically actuated control valve comprising three mouths and three operating positions, wherein said three mouths comprise:
    a first mouth for inlet of a working fluid; and
    a second mouth and a third mouth for outlet of the working fluid,
    and wherein said three operating positions comprise:
    a first operating position, in which a passage of fluid from said first mouth to said second mouth and third mouth is enabled,
    a second operating position, in which a passage of fluid from said first mouth to only one of said second and third mouths is enabled, and
    a third operating position, in which the passage of fluid from the first mouth to the second mouth and the third mouth is disabled,
    an electric or electromagnetic actuator that can be controlled to cause a switching of the valve between said operating positions,
    the control valve comprises a first valve element and a second valve element, which co-operate, respectively, with a first valve seat and a second valve seat,
    said first valve element and said first valve seat pre-arranged for controlling passage of fluid from said first mouth to said third mouth, and
    said second valve element and said second valve seat pre-arranged for adjusting passage of fluid from said first mouth to said second mouth, and
    said electric or electromagnetic actuator comprises an actuator member operatively connected to said second valve element and designed to impress on said second valve element:
    a first movement whereby said second valve element is brought into contact with said second valve seat disabling the passage of fluid from said first mouth to said second mouth and providing a switching from said first operating position to said second operating position, a second movement, subsequent to said first movement, whereby said second valve element moves said first valve element against said first valve seat disabling the passage of fluid from said first mouth to said third mouth and providing a switching from said second operating position to said third operating position, wherein during said second movement the second valve element is in contact with said second valve seat, and said first valve element and second valve element are coaxial and hydraulically balanced, said electric or electromagnetic actuator is of a type chosen between a piezoelectric actuator and a magnetostrictive actuator.

2. The control valve according to claim 1, wherein said electric actuator is a piezoelectric actuator, comprising an actuator member comprising a stack of piezoelectric elements set on top of one another and means for applying a voltage in parallel at the opposite ends of each piezoelectric element in such a way as to generate a lengthening of the stack of piezoelectric elements equal to the sum of the lengthenings of all the piezoelectric elements.

3. The control valve according to claim 1, wherein said electric actuator is a magnetostrictive actuator, comprising a solenoid and an actuator member comprising a bar of magnetostrictive material set within the solenoid, and means for supplying an electric current to the solenoid in such a way as to generate lengthening of said bar of magnetostrictive material.

4. The control valve according to claim 2, wherein said actuator comprises elastic means designed to induce a precompressive state of stress in said actuator member.

5. The control valve according to claim 1, wherein said actuator member is operatively connected to said second valve element with interposition of a transmission that generates a length of movement of the second valve element greater than the length of movement of the aforesaid actuator member.

6. The control valve according to claim 5, wherein said transmission is a hydraulic transmission.

7. The control valve according to claim 6, wherein said hydraulic transmission comprises a fluid cylinder with two sections of different diameter, a pumping member comprising said actuator member and slidable in the section of greater diameter of the cylinder, and a driven member connected to said second valve element and slidable in the section of smaller diameter of the cylinder.

8. The control valve according to claim 1, further comprising a jacket slidably mounted within which is said first valve element, wherein said first mouth, second mouth and third mouth of said valve are provided on said jacket and wherein moreover a first contrast surface is provided on said jacket and a second contrast surface is provided on said first valve element.

9. The control valve according to claim 8, further comprising a first elastic return element designed to co-operate with said first valve element and a second elastic return element designed to co-operate with said second valve element.

10. The control valve according to the claim 9, wherein said first elastic element recalls the first valve element into an open position thereof, spaced apart from the first valve seat and the second elastic element is set between the two valve elements and recalls the second valve element into an open position thereof, spaced apart from the second valve seat.

11. A fuel-injection system for an internal-combustion engine, comprising an injection valve driven by a control valve, wherein said control valve is provided according to claim 1.

12. The injection system according to claim 11, wherein said injection valve comprises a pulverizer plug connected to a plunger mobile between a first fluid chamber and a second fluid chamber configured in such a way that:

when the two fluid chambers are at a same pressure, the plunger remains in a position corresponding to a closed position of the plug of the pulverizer, when a first pressure in a first fluid chamber exceeds a second pressure in the other fluid chamber by a pre-determined value, the plunger shifts into a position corresponding to an open position of the plug of the pulverizer, said control valve having an inlet connected to a source of pressurized fluid and two outlets connected one to the discharge and the other to said second fluid chamber, said first fluid chamber being connected to said source of pressurized fluid.

13. The injection system according to claim 12, wherein the injection valve comprises a spring that pushes the plunger into the closing position of the plug of the pulverizer.

14. The injection system according to claim 12, wherein said source of pressurized fluid comprises at least one pumping element operated by a rotary cam.

15. The injection system according to claim 12, wherein said source of pressurized fluid comprises at least one pumping element operated by a rotary eccentric member.

16. The injection system according to claim 12, wherein said source of pressurized fluid comprises a high-pressure pump and a rail downstream thereof, said rail being connected to the control valve and to the first fluid chamber of the injection valve.

17. A method for controlling a fuel-injection system for an internal-combustion engine, wherein said system comprises an injection valve driven by a control valve, the method comprising:

the control valve provided according to claim 1, the injection valve comprising a pulverizer plug connected to a plunger mobile between a first fluid chamber and a second fluid chamber configured in such a way that:

when the two fluid chambers are at a same pressure, the plunger remaining in a position corresponding to a closed position of the plug of the pulverizer, when a first pressure in a first fluid chamber exceeds a second pressure in the other fluid chamber by a pre-determined value, the plunger shifts into a position corresponding to an open position of the plug of the pulverizer, said control valve having an inlet connected to a source of pressurized fluid and two outlets connected one to the discharge and the other to said second fluid chamber, said first fluid chamber being connected to said source of pressurized fluid, the voltage or the current for supply of said electric actuator of the control valve is varied in order to vary the law of the motion of said first and second valve elements in such a way as to obtain a desired law of motion of said plug of the pulverizer.

18. The method of control according to claim 17, wherein:
said first chamber of the injection valve that is connected to the source of pressure is an injection chamber that is set in communication with the external environment when the plug of the pulverizer opens,
said second chamber is a head chamber of the injection valve,
said plug of the pulverizer opens when the plunger shifts into the head chamber.

19. The method of control according to claim 17, wherein:
said first chamber of the injection valve that is connected to the source of pressure is a head chamber of the injection valve,
said second chamber is an injection chamber that is set in communication with the external environment when the plug of the pulverizer opens,
said plug of the pulverizer opens when the plunger shifts into the injection chamber.

20. The control valve according to claim 3, wherein said actuator comprises elastic means designed to induce a precompressive state of stress in said actuator member.

\* \* \* \* \*